United States Patent [19]

Sly et al.

[11] Patent Number: 5,443,729
[45] Date of Patent: Aug. 22, 1995

[54] METHOD FOR REMOVING MANGANESE FROM WATER

[75] Inventors: Lindsay I. Sly, Brookfield; Vullapa Arunpairojana, Bangkok; David R. Dixon, Blackburn; all of Australia

[73] Assignees: The University of Queensland, St. Lucia; Commonwealth Scientific and Industrial Research Organization, Canberra, both of Australia

[21] Appl. No.: 211,965
[22] PCT Filed: Oct. 26, 1992
[86] PCT No.: PCT/AU92/00579
§ 371 Date: May 9, 1994
§ 102(e) Date: May 9, 1994
[87] PCT Pub. No.: WO93/08128
PCT Pub. Date: Apr. 29, 1993

[30] Foreign Application Priority Data
Oct. 25, 1991 [AU] Australia ............... PK9104

[51] Int. Cl.⁶ ............................ C02F 1/64; C02F 3/34
[52] U.S. Cl. ............................. 210/611; 210/617; 210/688; 210/912; 435/262.5
[58] Field of Search .............. 210/610, 611, 615–618, 210/621, 622, 629, 631, 912, 688; 435/262.5

[56] References Cited

U.S. PATENT DOCUMENTS

| | | | |
|---|---|---|---|
| 4,391,887 | 7/1983 | Baumgarten et al. | 210/611 |
| 4,755,304 | 7/1988 | Hallberg et al. | 210/617 |
| 4,880,542 | 11/1989 | Sublette | 210/611 |
| 5,080,793 | 1/1992 | Urlings | 210/615 |
| 5,240,600 | 8/1993 | Wang et al. | 210/615 |
| 5,279,745 | 1/1994 | Jeffers et al. | 210/688 |

FOREIGN PATENT DOCUMENTS 534238 11/1979 Australia.
55-41873 3/1980 Japan.
59-177198 10/1984 Japan.
1-266897 10/1989 Japan.
8700162 1/1987 WIPO.

OTHER PUBLICATIONS

V. Janda, et al., "Removal of Manganese from water in fluidized bed", Chemical abstracts, vol. 110, No. 18, May 1, 1989, p. 382.
C. Czekalla, et al. "Quantitative removal of Iron and Manganese by Miroorganisms in Rapid Sand Filters", Pergamon Press Ltd. GB, vol. 3, 1965, pp. 111–123.
V. Janda, et al., "Managanese removal from water in a fluidized bed", Chemical abstracts, vol. 108, No. 14, Apr. 4, 1988, p. 408.
L. I. Sly, et al. "Effect of water velocity on the early development of manganesse depositing biofilm in a drinking-water distribution system", FEMS Microbiology Ecology, vol. 53, 1988, pp. 175–186.
L. I. Sly, et al. "Binding of Colloidal Mno2 by Edtracellular Polysaccharides of Pedamicrobium Manganicum", Appl. Environmental Microbiology 56, 1990, 2791–2794.

*Primary Examiner*—Thomas Wyse
*Attorney, Agent, or Firm*—Spensley, Horn Jubas & Lubitz

[57] ABSTRACT

A process for removal of manganese from water which includes the steps of (i) preparing a fluidized bed of particles (eg. magnetite) in a bioreactor capable of adsorbing a strongly adherent biofilm of microorganisms (e.g. pedomicrobium manganicum) metabolising manganese to provide an actively propagated biomass, and (ii) passing a stream of water through the fluidized bed where manganese is adsorbed by said biomass and is thus removed from the stream of water to provide a purified effluent of water exiting from the bioreactor.

13 Claims, 24 Drawing Sheets

METHOD FOR REMOVING MANGANESE FROM WATER

FIELD OF THE INVENTION

THIS INVENTION relates to a method and apparatus for removal of manganese from water and in particular potable or drinking water.

BACKGROUND OF THE INVENTION

The presence of manganese in drinking water constitutes a problem for many water authorities both in Australia (references 26 and 48 referred to hereinafter in the LIST OF REFERENCES) and overseas (4,62) as a cause of manganese-related "dirty-water" in urban distribution systems. Manganese entering the distribution system accumulates as a black manganese oxide biofilm on pipe surfaces and causes consumer complaints when it sloughs off (4, 26, 48, 51, 52, 53, 62). In a chlorinated drinking water system the manganese oxide may be deposited chemically or may be accumulated by viable bacterial biofilms which develop in areas with insufficient chlorination (48, 51, 52, 53).

The manganese-related "dirty water" is not associated with any known health risk but the water is aesthetically unacceptable and causes economic losses by irreversible staining of washing, equipment, manufactured goods and swimming pools.

The problem is widespread in Australia with many cities and towns along the east coast from Cairns in North Queensland to Wyong and Woolongong in New South Wales experiencing problems. Many of these coastal towns rely on tourism as their major industry and are expected to maintain high standards for their tourist image. In 1985, the most affected consumer complaints reached as high as 870 per week (48, 51, 53).

Most water authorities aim through various water treatment strategies to reduce manganese in drinking water to the WHO and NHMRC recommended level of 0.05 mg/l (41,62). The American Water Works Association goal level is 0.01 mg/l (4).

A recent extensive study (48, 51, 52, 53) of the Gold Coast water distribution system has shown that manganese-related consumer complaints occur when manganese levels reach 0.02 mg/l and approaches 80 per week when levels rise to 0.05 mg/l. These consumer complaints are only an indication of the total number of consumers affected.

Current water treatment methods for the removal of manganese and iron from raw water supplies are destratification and oxygenation of the raw water supply (46,61) and chemical oxidation at the treatment plant followed by filtration (61). The most commonly used oxidants are $KMnO_4$, chlorine, chlorine dioxide and ozone (61).

A survey of treatment plants by Green (24) indicates that the use of sand filters as a manganese removal reactor effectively restricts the filter loading rate to about 5 $mh^{-1}$. Modern rapid sand filters are designed to operate at up to 9 $mh^{-1}$ (32). It is evident, therefore, that if the economic benefits of high rate filtration are to be achieved for high manganese sources, then significant manganese removal must be achieved at treatment stages preceding filtration (32).

Manganese (II) is not removed by conventional water treatment processes such as alum flocculation unless an oxidation step is included. The most common oxidant is $KMnO^4$ which converts Mn (II) to Mn (IV) and this colloidal precipitate is subsequently removed by filtration. There are practical difficulties with this method as the rate and extent of oxidation is dependent on factors such as the speciation of manganese, the characteristics of organics present and filter efficiency. These factors are often beyond the control of the plant operator. On occasions very little manganese is removed at worst the concentration may be higher after treatment that in the raw water.

Recently, chlorine and chlorine dioxide have been used in the dual roles of disinfection and oxidation (61).

Biological oxidation of manganese offers an alternative to chemical methods and is already being used to some extent in water treatment, but not to its full potential.

At neutral pH, manganese, unlike iron, is not oxidized by oxygen alone. The oxidation of manganese in natural and destratified oxygenated water storages is due to part of the action of manganese-oxidising microorganisms (22, 57, 55).

There exists in nature a variety of microorganisms such as bacteria and fungi which are capable of oxidising manganese (22, 25). Such organisms are ubiquitous in their distribution occurring widely in natural soil and water habitats. Some of these organisms are well adapted to an attached mode of growth.

Biological oxidation and removal of manganese has been shown to occur in rapid sand filters colonised by manganese-oxidising bacteria (6,14,15,38). In a comprehensive study (13) of sand filters om 21 treatment plants in Germany it was shown that the bacteria involved in manganese removal belong to the genera Hyphomicrobium, Leptothrix, Metallogenium, Siderocapsa and Siderocystis. These organisms appear to have a superior ability to adhere to surfaces and to withstand the shear forces associated with flowing water. These organisms are frequently to be found in association with iron-oxidising organisms such as Gallionella, Leptothrix and together they contribute to rapid removal of manganese and iron.

Such biologically active sand filters can be operated at loading rates of up to 13 $mh^{-1}$ (13) and 24 $mh^{-1}$ (38) and are therefore compatible with modern water treatment requirements. Disadvantages associated with using sand filters as packed-bed bioreactors include clogging and binding of particles as biomass develops (2). This results in reduced flow rates and a reduction in biofilm surface area available for contact with manganese. It has been shown that the oxidation of manganese occurs on extracellular polymeric slime on the surface of manganese-oxidising bacteria (13,23). Binding of particles causes channelling to occur in the packed-bed so that water passes through with inadequate treatment. These problems necessitate frequent periodic cleaning of filters by vigorous backwashing, which may result in the removal of active biofilm and time is necessary for the filter to re-establish its manganese removal efficiency (18). The utilisation of microorganisms in waste water and sewage treatment is well established. Their utilisation in the treatment of drinking water has not been widely exploited. Where they are used in the removal of manganese and iron (6,13,15,38), the process is poorly understood and has not been developed to the same level of technology as for waste water treatment. Little is known about the environmental conditions which control the growth and metabolic rate of manganese-oxidising bacteria. There is a body of research in the literature on the biochemical mechanism proposed for manganese oxidation. The results are frequently conflicting and very dependent on the organism studied (eg. 15,22).

SUMMARY OF THE INVENTION

It is therefore an object of the invention to provide a method and apparatus for removal of manganese from water which alleviates the problems of the prior art discussed above.

The process of the invention includes the steps of:
(i) preparing a fluidised bed of particles in a bioreactor capable of adsorbing a strongly adherent biofilm of microorganisms capable of metabolising manganese to provide an actively propagated biomass; and
(ii) passing a stream of water through the fluidised bed wherein $Mn^{2+}$ or colloidal manganese from the stream of water is adsorbed by said biomass and is thus removed from the stream of water to provide a purified effluent of water exiting from the bioreactor.

In accordance with the invention the development of a fluidised-bed bioreactor offers several advantages over conventional sand filters for the removal of manganese. Such reactors rely on the growth of immobilised cultures on small particles suspended in a water column by up-flowing water (2). This technology offers high surface area to biomass volume ratios and thus higher efficiency for a given volume of reactor. An added advantage is that fluidised-beds expand to accommodate growing biomass and to tend to be self cleaning and will not clog (2).

Small, dense, monosized support particles have been recommended for aerobic water treatment (2). Small particles are desirable because they give a higher surface area of biomass and there will be less transfer resistance. Unlike a packed-bed the particle size and density, and the flow velocity in a fluidised-bed are not independent variables. In accordance with the invention it is considered that the combination of a dense particle and a strongly adherent biofilm of manganese-oxidising bacteria could be exploited in a biotechnological process for the oxidation of manganese in water treatment. By using a continuous recirculating fluidised-bed bioreactor it was considered possible to select a particle size and flow velocity with a resultant shear force which would ensure the dominance of the manganese-oxidising biofilm. A suitable particle size for the particles is of the range 50 $\mu m$ to 1000 $\mu m$ (ie 1 mm).

Several strains of *Pedomicrobium manganicum* have been isolated from a water distribution system biofilm (48, 49,51,52,53), and it has been shown that this organism was able to withstand the shear forces associated with high flow rates (52).

Tyler and Marshall (58,59) previously showed that a similar manganese-oxidising budding bacterium *Hyphomicrobium sp.* was the dominant organism in biofilm which developed in hydroelectric pipelines in Tasmania, illustrating the suitablility of this type of organism for a fixed biofilm reactor. Hyphomicrobium differs from Pedomicrobium by its ability to use Cl compounds as a source of carbon and energy and its ability to utilise inorganic nitrogen sources. Pedomicrobium required complex organic carbon and nitrogen sources such as humic acids which are commonly found in raw water sources (20,48). Tyler and Marshall's culture (strain T37) of Hyphomicrobium has since lost the ability to oxidize manganese through repeated laboratory subculture and was not available for study. However, the fact that Hyphomicrobium strains as well as the microorganisms referred to above in (13) may also be used to metabolise manganese show that the invention is not limited to strains of *P. manganicum* and that the invention is applicable to any microorganisms which are capable of metabolizing manganese.

It is also believed that magnetite particles used in the Sirofloc water purification process (31) have the necessary density and surface characteristics for a suitable support particle. In an Australian patent 534238 (reference 3) it has been shown that microorganisms attach strongly to magnetite without diminishing their capacity to function microbiologically. Mac Rae and Evans (33,34) showed that magnetite rapidly adsorbed 95–99% of a variety of microbial cells from aqueous suspensions.

The process of the invention includes the installation of a continuous recycle fluidised-bed bioreactor (CRFB) for the oxidation of manganese (II) as the raw water enters the treatment plant. Such a process would operate without the addition of expensive chemical oxidants. In a wide-ranging study of Australian water resources to the end of the century, Garman (19) concluded that "the presence of iron and manganese in Australian waters is seen as a major expense for water treatment costs".

An additional advantage hypothesised was that the manganese (IV) formed would be firmly bound to organic expolymeric substances either free or on the surface of cells. This material would be more easily removed by alum flocculation and/or filtration than chemically formed manganese oxide alone.

The treated water would undergo normal disinfection by chlorination. It should be emphasised that the organisms are involved are harmless aquatic organisms and pose no health threat (17).

It is considered that the process of the invention has significantly contributed towards a better fundamental understanding of biological manganese oxidation and will very likely result in a major improvement in the capacity of water treatment plants to reduce manganese to acceptable levels. The simplicity of the process studied also takes it suitable for primary treatment of water in small communities.

As will be apparent from the description hereinafter methods were developed for the immobilisation of *Pedomicrobium manganicum* cells on magnetite particles and to use the immobilised cells in a continuous recycle fluidised bioreactor (CRFB) for the removal of manganese from water. A model CRFB was operated for 22 weeks with removal rates of greater than 90% and up to 100% for $Mn^{2+}$ concentrations in the range 0.25 to 8.5 mg/l when operated at a residence time of 21 hours. The majority of the manganese in the effluent was residual $Mn^{2+}$ with only low levels of oxidised and adsorbed manganese. As was hypothesised the bulk of the oxidised manganese remained attached to the immobilised cells in the fluidised column. The bioreactor approached maximum removal efficiency within a week compared with up to 15 weeks for sand filters relying on colonisation by natural populations of manganese oxidising bacteria. The CRFB required minimal maintenance, did not clog or bind and therefore did not require backwashing which is a disadvantage with sand filters. The pH conditions were critical for manganese adsorption, oxidation and removal. Optimal conditions were found to be around pH7.8. The research showed that surface components of *P. manganicum* were significant reservoirs of $Mn^{2+}$. At pH8 approximately 45% of the $Mn^{2+}$ was adsorbed passively to the surface $MnO_2$ and 55% to the extracellular components which were most likely acidic polysaccharides. The extracellular components stabilised the adsorption of $Mn^{2+}$ to the cells at low pH. Research showed for the first time that the extracellular acid polysaccharides of *P. manganicum* are also able to bind preformed colloidal $MnO_2$ a property which may be exploited in the CRFB for removal of fine particulate $MnO_2$.

DETAILED DESCRIPTION OF THE INVENTION

Experimental Results

SECTION 1

Figure 1:
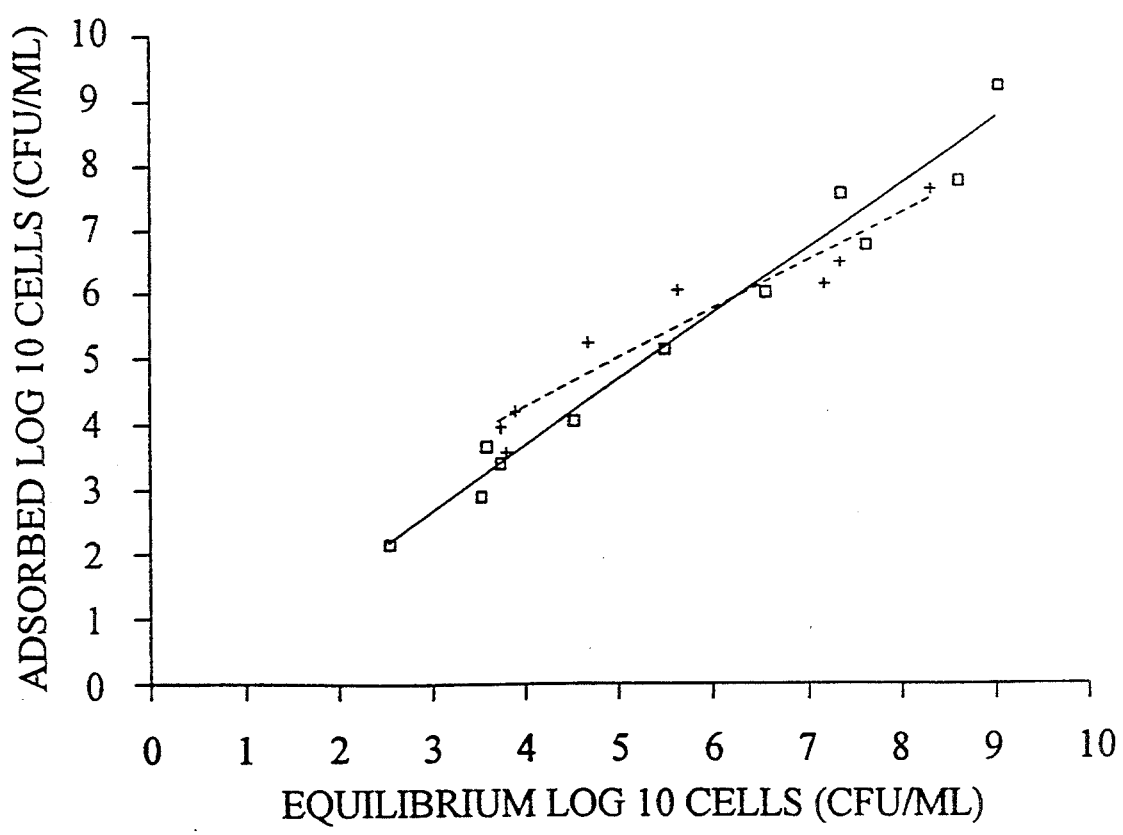
FIG. 1 is a graph showing isotherms for adsorption of *P. manganicum* strains to 1% magnetite (211–246 μm).

The Immobolization of *Pedomicrobium mangamicum* Cells on Magnetite Particles

INTRODUCTION

Work in this section was undertaken to investigate the ability of *P. manganicum* strains to absorb magnetite particles of various sources and sizes. These investigations were a prerequisite to the immobolization studies conducted in the bioreactor in Section 4.

MATERIALS AND METHODS

Bacterial culture. The strain of microorganism used was *Pedomicrobium manganicum* UQM 3067 previously isolated from a water distribution system with manganese-depositing biofilm (51).

Magnetite. Crude ore obtained from Commercial Minerals was processed by sieving to the required size of 212–300 μm diameter. The magnetite particles were treated by eight alternating magnetic field cycles (8AMF) using the method of Mac Rae and Evans (33,34). This treatment was carried out by mixing 1 volume of untreated magnetite with 4 volumes of 0.1M NaOH for 10 minutes followed by 4 ten minute washings with distilled water using decantation and then final readjustment to pH4 with 1M $H_2SO_4$. Decantation was facilitated by the use of a magnet to hold the magnetite in the base of the beaker. The magnetite was then passed through a demagnetising field (Eclipse AD960, England) to disperse the particles. This treatment process was repeated 8 times.

Immobilization jar tests. The adsorption of *P. manganicum* cells to 8AMF magnetite particles was studied in jar tests prior to immobilization in the CRFB. A 1% volume of settle magnetite was added to 200 ml cell suspension in immobilization suspending medium (33) in a 250 ml beaker and stirred at 250 rpm with a paddle stirrer for 10 minutes to keep the magnetite suspended and mixed. After cell adsorption the magnetite was allowed to settle for 2 minutes with the aid of a magnet. Dilutions of cell suspensions were made before and after adsorption and triplicate 0.1 ml samples were plated on PSM agar (20) to determine the number of unadsorbed cells. Agar plates were incubated at 28° C. for 10 days.

RESULTS

Adsorption of *P. manganicum* to Magnetite Particles

Magnetite. The magnetite preparations used in the study are listed in Table 1. Unexpectedly, it was not possible to obtain magnetite of the required size commercially. Consequently considerable time and effort was involved in processing crude ore in our own laboratories and sieving to the required size of approximately 200-300 μm diameter. Smaller sizes of 104-147, 147-211, and 211-246 μm were also studied in preparation for later studies on the effect of particle size on manganese removal. The isoelectric points of the preparations were in the range of 5.14 to 5.82.

Selection of *P. manganicum* culture. Two cultures were selected on the basis on manganese oxidation from the eight cultures of *P. manganicum* previously isolated (48,49,51). The strains selected were UQM3066 and UQM3067. The adsorption of cells to magnetite was carried out in jar tests using the method of Mac Rae and Evans (33,34). The adsorption was assessed by viable counts on PSM agar (20) of cells remaining unadsorbed. FIG. 1 shows the isotherms for the adsorption of the cultures to magnetite particles of 211-246 μm. There was a significant statistical difference bewean the two strains and strain UQM3067 was selected for further study because it appeared to offer slightly better loadings of magnetite particles at higher concentrations of cells.

It can be seen from FIG. 1 that only approximately 50% of the cells were adsorbed. This value was considerably lower than that 99% obtained for other organisms on 5 μm particles by Mac Rae and Evans (33). The most likely explanation was the reduced magnetite surface area and the slightly reduced purity of magnetite resulting from the larger size of particle which contains some impurities. The isoelectric points (Table 1) support this as values of 6.5-7.0 would have been expected for high purity magnetite. Several experiments were conducted to show that other factors in the adsorption process were not the cause. These included the effect of pH, mixing method and time.

Figure 2:
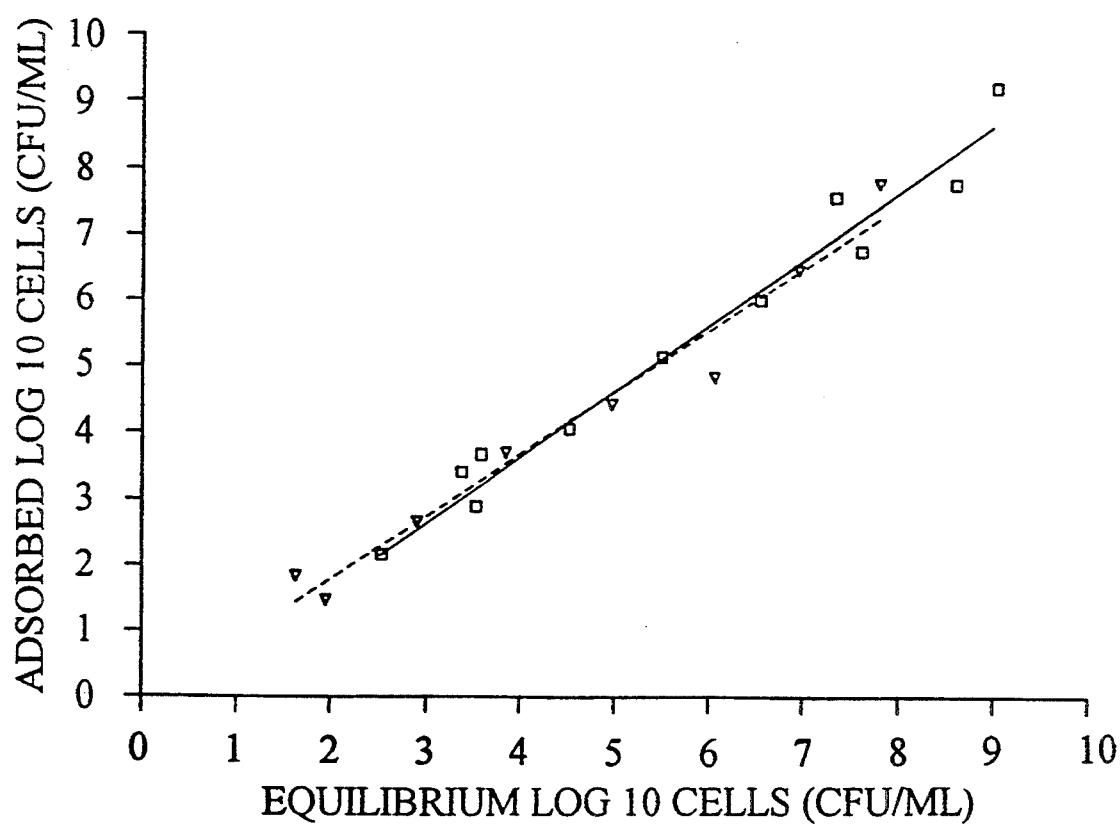
FIG. 2 is a graph showing isotherms for adsorption of *P. manganicum* strain UQM3067 to 1% magnetite (211–246 μm) at varying pH.

Effect of pH. The previous experiments were conducted at pH 7 which is the desirable value for the bioreactor treating natural waters. However, adsorption of cells was also tried at pH 6 to see if this slightly acidic pH might improve adsorption. FIG. 2 shows that there was no significant difference between adsorption at pH 6 and pH 7 and subsequent experiments were conducted at pH 7.

Figure 3:
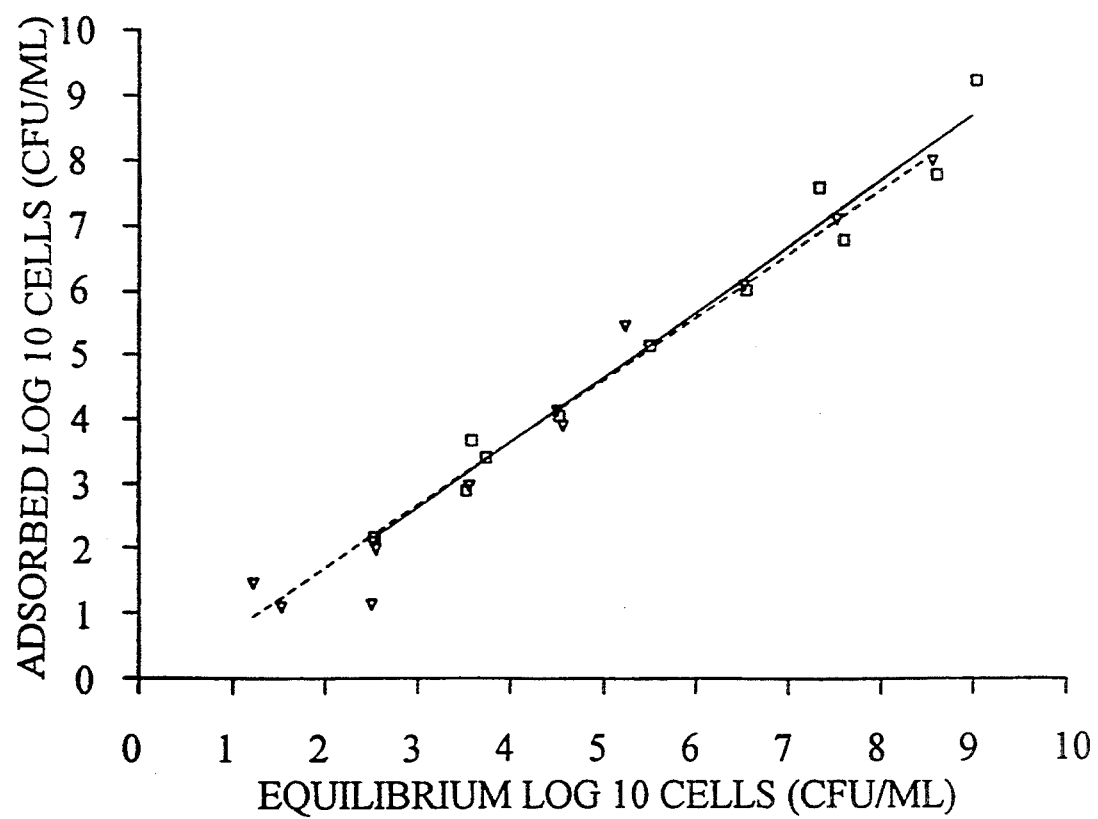
FIG. 3 is a graph showing isotherms for adsorption of *P. manganicum* strain UQM3067 to 1% magnetite (211–246 μm) using mixing by stirring and shaking.

Effect of mixing method. A possible cause of the reduced adsorption was the shearing forces caused by the more vigorous stirring required to suspend particles of the size studied compared with smaller 5 μm particles examined previously by Mac Rae and Evans (33,34). To test this possibility adsorption was also studied by more gentle mixing accomplished by gently inverting the mixture 60 times per minute. FIG. 3 shows that there was no significant difference between the two methods.

Figure 4:
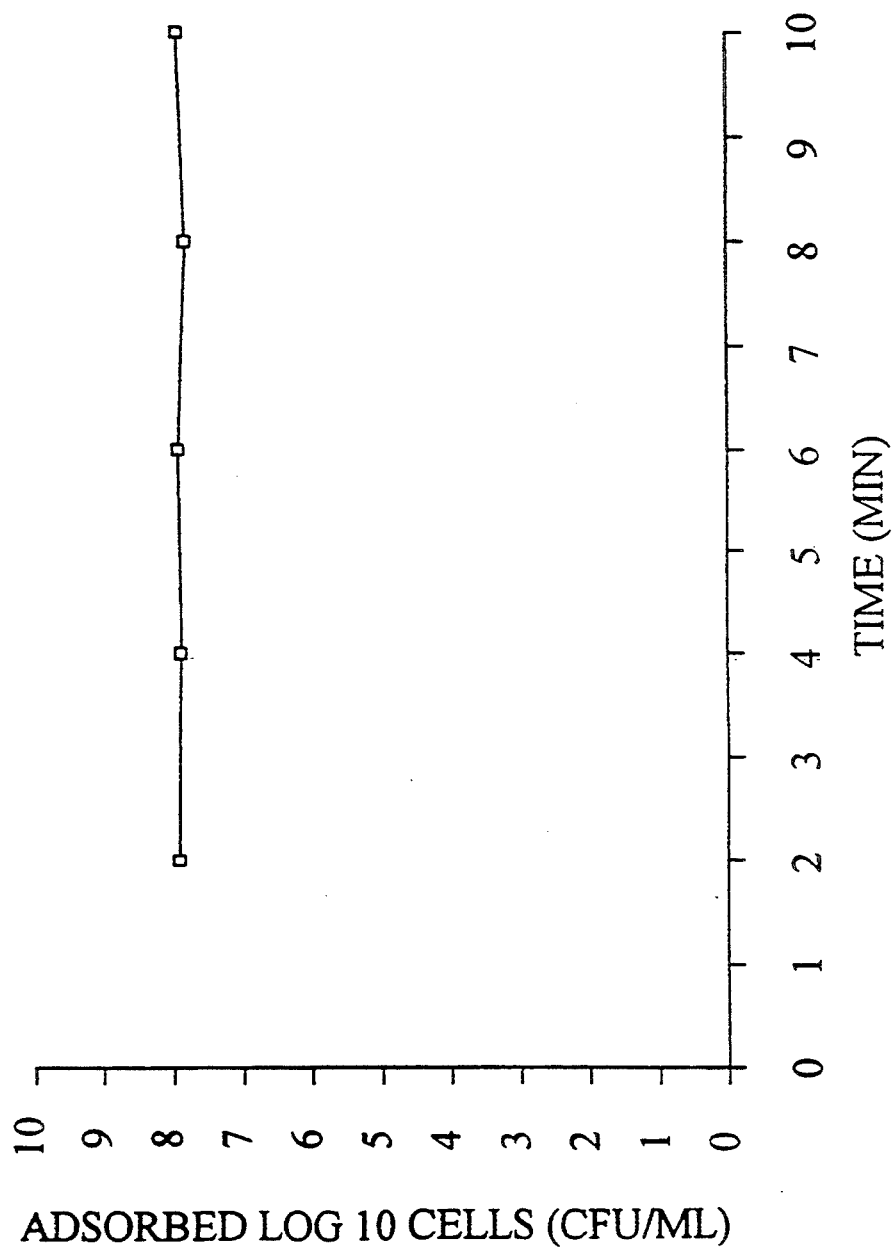
FIG. 4 is a graph showing the effect of mixing time on the adsorption of *P. manganicum* UQM3067 to 1% magnetite (211–246 μm).

Effect of mixing time. A further possible cause of reduced adsorption was the nature of the growth of *P. manganicum*. This organism does not grow as single cells but as a network of hyphae and budding cells. It was possible the vigorous stirring was breaking up clumps of cells producing an effectively higher count during mixing and therefore artificially reducing the adsorption efficiency. However, the results in FIG. 4 show that the number of adsorbed cells remained constant over time, as did the number of unadsorbed cells, and that mechanical disruption was not a significant factor.

Figure 5:
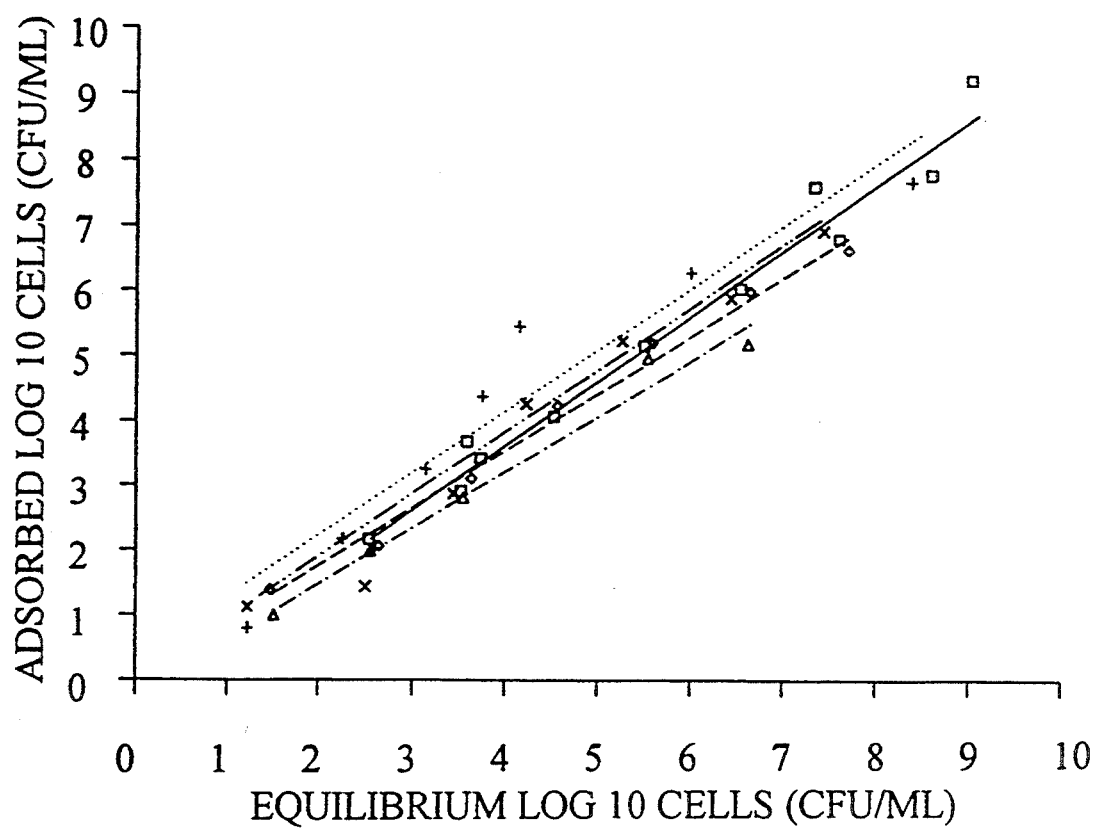
FIG. 5 is a graph showing isotherms for the adsorption of *P. manganicum* UQM3067 to 1% magnetite of various sizes and sources.

Effect of source and particle size. Adsorption of *P. manganicum* to the magnetite particles listed in Table 1 was carried out. The results presented in FIG. 5 show that there is no practical difference in adsorption to magnetite from different sources or to magnetite particles in the size range 104-300 μm diameter. There were, however, some significant statistical differences which are being examined further but these are unlikely to effect the operation of a bioreactor.

Effect of growth medium. The adsorption experiments reported were conducted by suspending the cells in the standardised suspending medium of Mac Rae and Evans (33,34). In order to test the effect of the PC growth medium to be used in the bioreactor, experiments were carried out to determine if cells adsorbed when transferred to PC medium. The results presented in Tables 2 and 3 show that there was no significant difference in the number of cells adsorbed when particles were transferred to suspending medium of PC medium. In both cases the loss was about 26%. It can also be seen that the cells remaining were firmly adsorbed and there was no significant difference in the number of cells remaining adsorbed at 10 minutes compared with 30 seconds (Tables 4 and 5).

Effect of repeated adsorption. Further experiments were conducted to determine if the less than expected adsorption was due to reduced surface area as postulated. A suspension of *P. manganicum* cells was treated with magnetite particles. The unadsorbed cells were removed and retreated with fresh magnetite. This process was repeated four times. The results presented in Table 6 show that a reducing proportion of cells was adsorbed with each subsequent treatment. This indicates that more than one factor is causing this result. Surface area is probably a factor but also it seems that a proportion of cells have surface characteristics which are less susceptible to adsorption to magnetite. However, this is a minor proportion and after four adsorptions only 6% of cells remained unadsorbed.

SECTION 2

The Adsorption and Desorption of $Mn^{2+}$ by Surface Components of *Pedomicrobium manganicum*

INTRODUCTION

This research was undertaken because of a need to determine the amount of $Mn^{2+}$ adsorbed to particulate manganese and to the surface of *Pedomicrobium manganicum* cells during studies on manganese oxidation rates under different enviromental conditions in the bioreactor. Two major extracellular components adsorb significant levels of $Mn^{2+}$. These are the extracellular acidic polysaccharides which have been shown by Ghiorse and Hirsch (23) to be intimately associated with manganese oxidation in *Pedomicrobium sp.*, and the manganese oxide deposited on the polysaccharides (37).

It is thought that adsorption of $Mn^{2+}$ to the extracellular polysaccharides is a prerequisite to manganese oxidation by an as yet unidentified protein or enzyme (23). The adsorptive properties of $MnO_2$ for $Mn^{2+}$ and other divalent metal ions are well documented (37) and are related to its surface properties (28,36,39). The adsorption of $Mn^{2+}$ to $MnO_2$ is pH independent (37) and because of the polyanionic nature of acidic polysaccharides (27) it would be expected that the adsorption of $Mn^{2+}$ to the polysaccharides would also be pH dependent. What was not known is the contribution of each component or other components such as surface proteins to $Mn^{2+}$ adsorption by *P. manganicum* and the desorptive behaviour of each under changing pH conditions.

Desorption by ionic exchange using the divalent metal ions $Mg^{2+}$ and $Cu^{2+}$ has been used to estimate the level of $Mn^{2+}$ adsorbed to particulate $MnO_2$ (1,7,8,11,30) bit the effectiveness of these methods for quantitative studies with *P. manganicum* is not known.

This section reports the results of a series of experiments which investigated the adsorption of $Mn^{2+}$ by surface components of *Pedomicrobium manganicum* and the effect of pH and cationic exchange on $Mn^{2+}$ desorption.

MATERIALS AND METHODS

Microorganism. The strain used in these studies was *Pedomicrobium manganicum* UQM3067 which was isolated from a drinking-water distribution system experiencing manganese-related dirty water problems (51).

Growth of *P. manganicum*. Strain UQM3067 was grown at 28° C. in 21 flasks containing 11 PC medium (58). PC medium contained 0.005% Bacto yeast extract (Difco) and 0.002% $MnSO_4.4H_2O$ in deionised water. Cells for $Mn^{2+}$ adsorption experiments were grown for 3 weeks until no residual $Mn^{2+}$ remained in the growth medium. The cells were harvested by centrifugation at 7000 g for 10 minutes and washed twice with deioinsed water before use.

Glassware. All glassware used was acid washed in 8N nitric acid and then rinsed with high purity deionised water (milli-Q, Millipore Corporation, France).

$Mn^{2+}$ adsorption experiments. Adsorption of $Mn^{2+}$ (manganese nitrate spectroscopy standard, BDH Chemicals) to $MnO_2$-encrusted *P. manganicum* cells or abiological $MnO_2$ (precipitated $\beta$-$MnO_2$ (pyrolusite) Ajax Chemicals) was carried out in 100 ml glass beakers. The surface area of both systems was approximately 0.25 m². *P. manganicum* were evenly coated with $MnO_2$ and it has been assumed that the surface area is a measure of exposed $MnO_2$ surface on the cells. Washed cell pellets (0.25 g wet wt.) containing 464 μg $MnO_2$ were resuspended in 0.5 ml deioised water and added to 50 ml maganese nitrate solution containing approximately 80 μg $Mn^{2+}$ and previously adjusted to pH 8 with soium hydroxide. The mixture was stirred gently with a magnetic stirrer at room temperature for 5 minutes after which $Mn^{2+}$ adsorption was complete. In experiments using abiological $MnO_2$ the microbial cells were substituted by an equivalent amount of finely ground abiological $MnO_2$ with the same surface area. Samples (5 ml) of adsorption mixtures were taken and filtered immediately through 0.1 μm membrane filters (Sartorius GmbH, W. Germany). The filtrates were analysed to determine unadsorbed $Mn^{2+}$.

$Mn^{2+}$ adsorption inhibition experiments. Various treatments of *P. manganicum* cells designed to inhibit metabolic activity or adsorption to extracellular proteins or polysaccharides were undertaken to determine their effect of $Mn^{2+}$ adsorption. The treatments included: autoclaving (121° C./15 min.), steaming (100° C./10 min.) (9), EDTA extraction (9), Zwittergent extraction (14), 2M NaOH extraction (9), 10 mM $NaN_3$ (30), 1 mM $HgCl_2$ (23), 0.05% (w/v) glutaraldehyde (23), and protease (Sigma P-5147, 0.3 units/ml). Treated cells were studied as described above for normal viable cells with the addition of inhibitors to the mixtures where appropriate.

$Mn^{2+}$ desorption experiments. After adsorption of $Mn^{2+}$ at pH 8 the effect of pH on $Mn^{2+}$ desorption was followed by adjusting the pH of the reaction mixtures in stepwise increments from 8 down to 2 by the addition of nitric acid. Samples (5 ml) were taken at each pH interval and filtered immediately through 0.1 μm membrane filters (Sartorius GmbH, W. Germany). The filtrates were analysed to determine unadsorbed $Mn^{2+}$. Control experiments were included to correct for any $Mn^{2+}$ desorption from *P. manganicum* cells or abiological $Mn^{2+}$.

Determination of $Mn^{2+}$ adsorbed to *P. manganicum*. Various published treatments were used to compare their effectiveness for $Mn^{2+}$ desorption from $MnO_2$-encrusted cells of *P. manganicum*. The reagents used were 10 mM $MgSO_4$, pH 4.2 (8) and 10 mM $CuSO_4$ in 1M ammonium acetate, pH 7 (8). Each treatment was tested on samples at pH 2, 4 and 7. A 5 ml volume of cell pellet to which approximately 7 μg of $Mn^{2+}$ had been adsorbed was mixed with 5 ml of desorption reagent. The mixtures were gently agitated for 4 h and then filtered through a 0.1 μm membrane filter (Sartorius GmbH, W. Germany). The filtrates were analysed to determine the $Mn^{2+}$ desorbed. The difference between $CuSO_4$- or $MgSO_4$-treated cells and control water-treated cells was used to determine the amount of $Mn^{2+}$ desorbed and by calculation the amount of $Mn^{2+}$ adsorbed to the cell pellet (30). The concentration of soluble Mn in the filtrates was determined by flame atomic absorption spectrophotometry.

Analysis of Mn. The porphyrin colorimetric method of Ishii et al. (29) was used to determine $Mn^{2+}$ concentrations in filtrates by measuring absorbance at 469 nm in 4 cm light-path curvetres in a Unicam SP600 spectrophotometer (PYE Unicam Ltd., U.K.) and comparing with a standard curve using dilutions of manganese nitrate spectroscopy standard (BDH Chemicals). In the $CuSO_4$ desorption experiments manganese was determined by flame atomic absorption spectrophotometry using a Varian AA875 spectrometer because of interference with the prophyrin colorimetric method by the presence of $CuSO_4$. Flame atomic absorption spectrophotometry was also used to determine $MnO_2$ concentrations in cell preparations after digestion in 11M HCl.

Determination of surface area. Surface area analyses were carried out by the gas adsorption technique (17) with a Micromeritics R5AA 2205 surface area analyser using argon as the asorbate.

RESULTS

Adsorption of $Mn^{2+}$ to *P. manganicum*. The results of experiments presented in Table 7 show that viable cells of $MnO_2$-encrusted *P. manganicum* adsorbed more than twice as much $Mn^{2+}$ at pH 8 as cells killed by autoclaving at 121° C. for 15 minutes or steaming at 100° C. for 10 minutes. The heat-killed cells adsorbed approximately the same amount of $Mn^{2+}$ as abiological $MnO_2$ with the same surface area. The treatment of viable *P. manganicum* cells with 10 mM $NaN_3$ to inhibit metabolic activity did not reduce the capacity of the cells to adsorb $Mn^{2+}$. Similarly, treatment of cells with 1 mM $HgCl_2$, 0.05% glutaraldehyde or 0.3 units/ml protease to denature extracellular enzymes or proteins had no effect of $Mn^{2+}$ adsorption. Of the treatments chosen to denature extracellular polysaccharides, steaming at 100° C. for 10 minutes had a marked effect, and 2M NaOH had a slight effect. The experiments also showed that oxygen was not required for the adsorption of $Mn^{2+}$ to *P. manganicum* cells.

Effect of pH on $Mn^{2+}$ desorption from *P. manganicum*. In these experiments a comparison was made between the desorption of $Mn^{2+}$ from viable and killed (autoclaved) cells of $MnO_2$-encrusted *P. manganicum*, and abiological cell-free $MnO_2$, each system having the same surface area. As can be seen from the data in Table 7 and FIG. 6, the autoclaved cells of *P. manganicum* had a similar adsorptive capacity for $Mn^{2+}$ as abiological $MnO_2$ whereas viable cells and sodium azide-treated cells had more than twice the adsorptive capacity.

Figure 6:
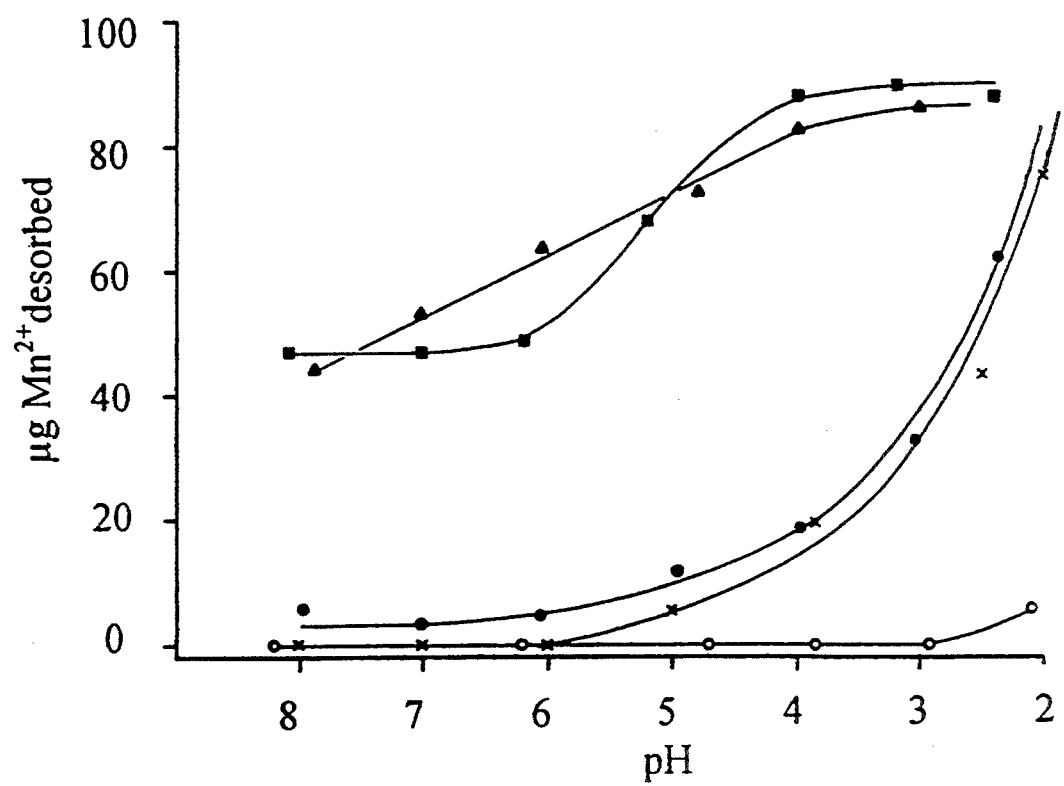
FIG. 6 is a graph of the effect of pH on the desorption of $Mn^{2+}$ from various sources of *P. manganicum*.

The desorption experiments presented in FIG. 6 showed two distinct pH desorption profiles. The experiments showed for abiological $MnO_2$ that as the pH was reduced no $Mn^{2+}$ was desorbed between pH 8 and pH 6 after which there was a steady desorption until this was complete by approximately pH 4 although the desorption occurred linearly over the entire pH 8 to pH 4 range. No dissolution of $MnO_2$ occurred at pH 2 over the period of the experiments.

In contrast to the desorption profile for abiological $MnO_2$, viable cells of *P. manganicum* exhibited an exponential desorption profile below pH 6 and sodium azide-treated cells behaved in a similar manner. Autoclaved cells behaved essentially as abiological $MnO_2$. However, whereas desorption from autoclaved preparations was complete at pH 4, viable cells were able to bind considerable amounts of $Mn^{2+}$ below pH 4 (Table 8) and desorption was not complete even at pH 2 (Table 9).

Determination of $Mn^{2+}$ adsorbed to *P. manganicum*. The results presented in Table 9 confirm that the $CuSO_4$ (pH 4.2) method of Bromfield and David (7) for the desorption of adsorbed $Mn^{2+}$ on particulate $MnO_2$ is the most effective. A maximum of 95.7% of the $Mn^{2+}$ adsorbed to the *P. manganicum* cells was recovered and the desorption efficiency was shown to the very reproducible with recoveries of 95.7 ±0.78% over eight replicate analysis. The addition of ammonium acetate to the $CuSO_4$ reagent reduced the desorption efficiency by 10%. $MgSO_4$ performed poorly as an aid to $Mn^{2+}$ desorption with only 2-3% of the $Mn^{2+}$ desorbed at pH 4. In deioised water, lowering the pH to 2 alone resulted in the desorption of 90.5% of the adsorbed $Mn^{2+}$. However, the addition of $CuSO_4$ at pH 2 reduced the desorption efficiency.

SECTION 3

The Binding of Colloidal $MnO_2$ by Extracellular Polysaccharides of *Pedomicrobium manganicum*

INTRODUCTION

Microorganisms make a significant contribution to the natural cycling of manganese (22,42,43). A wide variety of microorganisms have been shown to oxidise or reduce the oxidation states of manganese (5,20,22,25,42,51,58). Ghiorse and Hirsch (23) demonstrated that the oxidation and deposition of manganese by the budding hyphal bacterium *Pedomicrobium sp.* occurred on extracellular polysaccharides. This observation suggested a mechanism involving the adsorption of $Mn^{2+}$ to the extracellular polysaccharides followed by its oxidation to manganese oxide catalysed by an as yet unidentified agent. However, our observation of manganese oxide deposition by *Pedomicrobium manganicum* suggested that this organism may also be able to bind and deposit preformed manganese oxide in the absence of $Mn^{2+}$.

This section reports the results of a series of experiments designed to test the ability of the extracellular polysaccharides of *P. manganicum* to bind and deposit colloidal $MnO_2$.

METHODS AND MATERIALS

Microorganisms. The strain used in these studies was *Pedomicrobium manganicum* UQM 3067 which was isolated from a drinking-water distribution system experiencing manganese-related dirty water problems (51).

Growth of *P. manganicum*. Strain UQM 3067 was grown at 28° C. in Pedomicrobium standard medium (PSM) (20) containing 10 mM sodium acetate, 0.5 g/l Bacto yeast extract (Difco), vitamin supplement and mineral salts base adjusted to pH9. The mineral salts base 912) contained per liter: ethylene diamine tetraacetic acid (2.5 mg), $Zn2O_4.7H_2O$ (11 mg), $FeSO_4$ 7 $H_2O$ (5 mg) $MnSO_4$ $H_2O$ (1.54 mg), $CuSO_4$ $5H_2O$ (0.39 mg), $Co(NO_3)_2$ $6H_2O$ (0.25 mg), and $Na_2B_4O_7$ $10H_2O$ (0.18 mg). For binding experiments, cells were grown for 7 days in PSM broth, harvested by centrifugation at 7,000 g for 15 min. and washed twice with deionised water before use.

Glassware. All glassware used was acid washed in 8N nitric acid and then rinsed with high purity deionised water (Milli-Q, Millipore Corporation, France).

Preparation of colloidal $MnO_2$. Colloidal $MnO_2$ suspensions were prepared at room temperature by slowly adding a slight stoichiometric excess of potassium permanganate solution (8 ml, 40 mg Mn/L) to 150 ml manganous sulphate (1.33 mg Mn/L) while stirring. The mixture was made up to 200 ml with high purity deionised water and aged for 1 month until all the $Mn^{2+}$ was oxidised and the excess permanganate decomposed. The oxidation state of the colloidal $MnO_2$ was confirmed by iodometric titration (40) which gave a value of 4.08. Prior to use the colloidal $MnO_2$ was filtered through a 0.45 μm membrane filter and the concentration determined by flame atomic absorption spectrophotometry (AAS).

Binding of colloidal $MnO_2$. Washed cell pellets (0.2 g wet wt.) of *P. manganicum* were suspended in 5 ml deionised water and added to 400 ml colloidal $MnO_2$ suspension containing approximately 1 mg Mn/L and previously adjusted to the experimental pH with 0.1N NaOH for pH 7 experiments and 0.1N HNO3 for pH 4, 5 and 6 experiments. The pH was monitored during the course of each binding experiment. No pH change occurred at pH 6 and 7, and there was a 0.5 pH unit increase at pH 4 and 5 after 24 h. The mixture was stirred gently with a magnetic stirrer. The rate of binding was followed by monitoring the concentration of colloidal $MnO_2$ remaining in suspension. Control experiments were carried out without bacterial cells to take account of any aggregation of colloidal particles. Ten ml samples of the mixture were taken at 30 min. intervals for 5–7 hours and at 24 hours and filtered through 0.45 μm membrane filters. The concentration of manganese in the filtrates was determined by flame AAS using a Varian AA 875 atomic absorption spectrometer fitted with a graphite furnace. The apparatus was calibrated by use of standard manganese solutions obtained by dilution of a 1000 ppm spectroscopy standard solution (BDH).

Electron microscopy. After the completion of the binding experiments the cells of *P. manganicum* were recovered from the mixture by centrifugation at 2000 g for 10 min. and washed with deionised water to remove any unbound $MnO_2$. The cells were then fixed with 3% glutaraldehyde in 0.1M cacodylate buffer (pH 7.4) at room temperature. After 2 h the cells were washed 3 times in 0.1M cacodylate buffer and stored at 4° C. overnight. The cells were recovered by centrifugation and post-fixed at pH 7.4 for 2 h at 4° C. in 1% $OsO_4$ to which 5% ruthenium red (Johnson Matthey, London) was added to a final concentration of 0.05% (v/v). The cells were then immobilised in 2% agarose and the agar blocks dehydrated in ethanol and embedded in LR white medium grade resin (Bio-Rad, USA) (44). Polymerization of the resin was carried out for sequential 2 h, 4 h and 4 h periods at 50° C. under a nitrogen atmosphere and then overnight at 4° C. Thin sections were cut with a diamond knife using a Sorvall MT 5000 ultramicrotome and picked up on nitrocellulose coated copper grids. Thin sections on grids were stained with 4% uranyl acetate followed by 1.2% lead citrate (57) before examination in an Hitachi transmission electron microscope (Model H-800).

Energy dispersive X-ray microanalysis (EDAX). Semi-thin sections 700–800 nm thick on copper grids were stained as before and examined by EDX for the presence and location of manganese deposits using a JEOL transmission electron microscope (Model JSM-35 CF) fitted with a Tracer Northern X-ray analyser (Model TN 4000).

RESULTS

Figure 7:
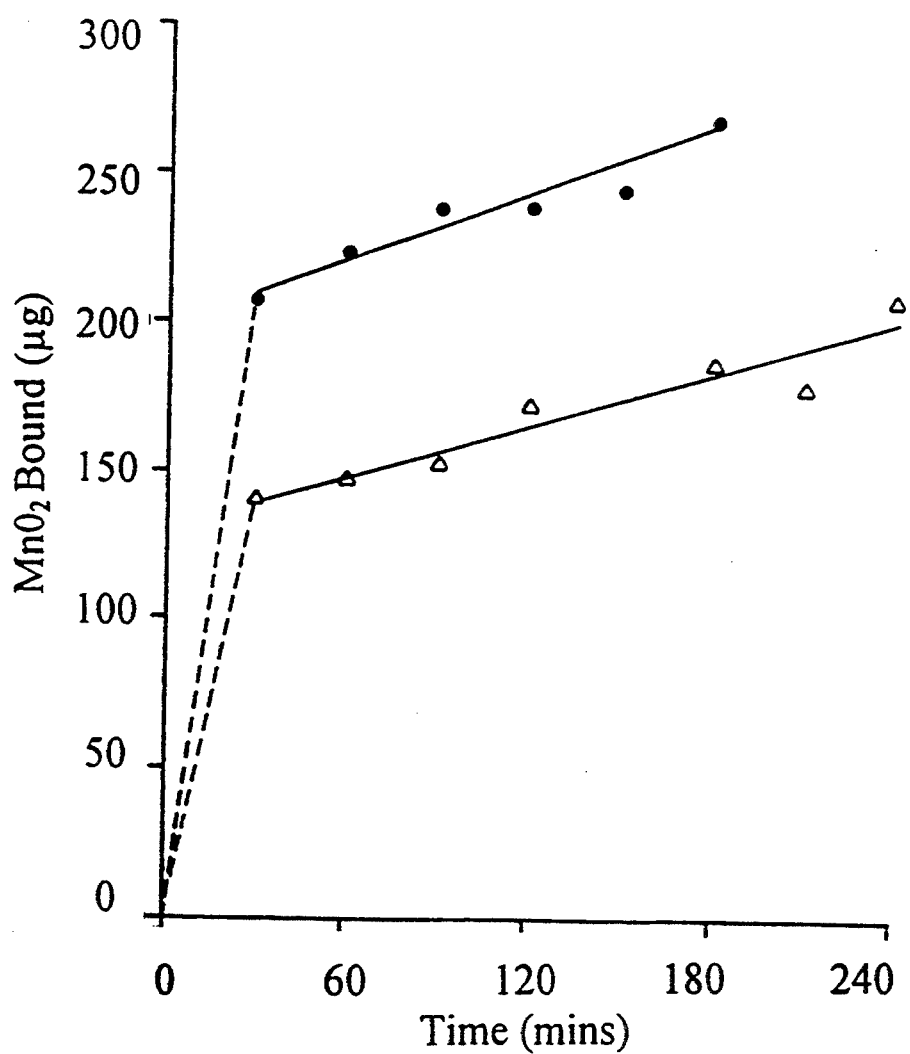
FIG. 7 is a graph showing binding of colloidal $MnO^2$ by cells of *P. manganicum* at pH7 and pH4.

Binding of colloidal $MnO_2$. The results of experiments presented in FIG. 7 show that cells (0.2 g, wet wt.) of *P. manganicum* were able to bind colloidal $MnO_2$. There was an initial rapid binding followed by a slower linear binding rate which extended over several hours. The initial binding level, the linear binding rate, and the total binding capacity were pH dependent (Table 10, FIG. 7). Only approximately 10% of the colloidal $MnO_2$ was bound at pH7 and pH6, but as the pH was lowered further, the binding capacity increased with a sharp rise between pH5 and pH4. At pH4, the cells bound 54% of the $MnO_2$ after 2 min. compared with 10.9% at pH7. After 150 min. at pH4, the level of $MnO_2$ bound had risen to 88% but this fell away to 54.8% after 24 h. This remaining $MnO_2$ was stably bound and no further desorption or detachment occurred on standing for a further 24 h or longer. The $MnO_2$ bound at pH4 was pH stable and remained bound to the cells even after increasing the pH to 5, 6 or 7 for 24 h.

Figure 8:
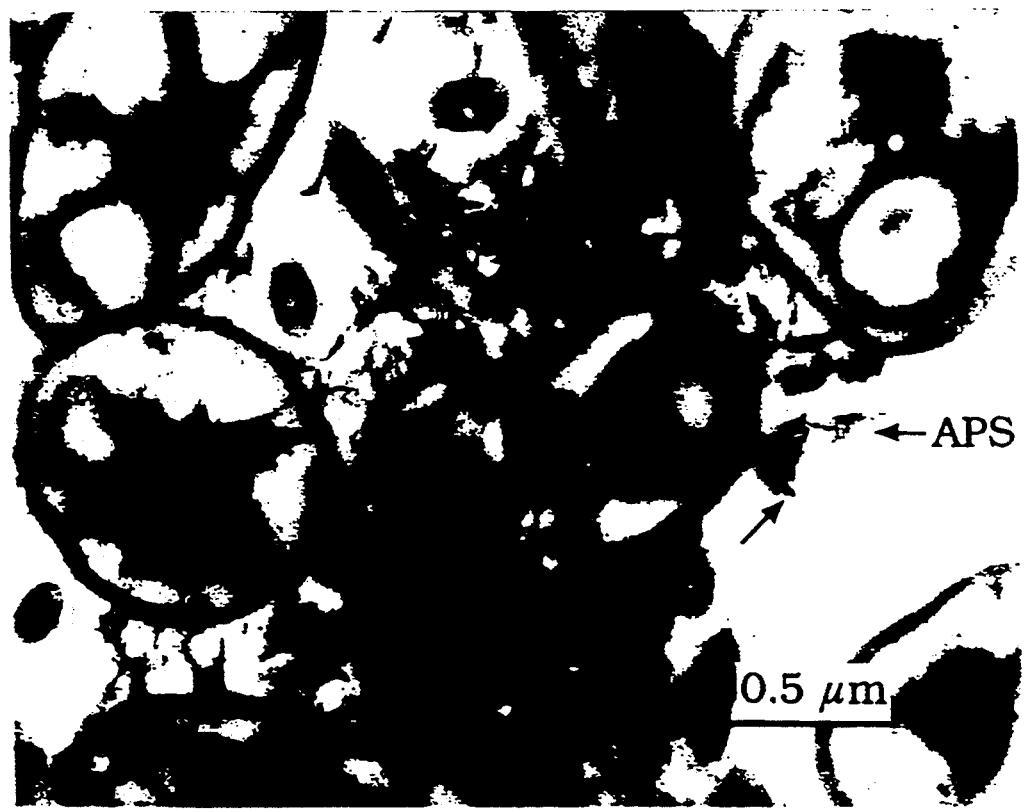
FIG. 8 is a transmission electronmicrograph of an ultra-thin section of *P. manganicum* containing colloidal $MnO^2$.
Figure 9:
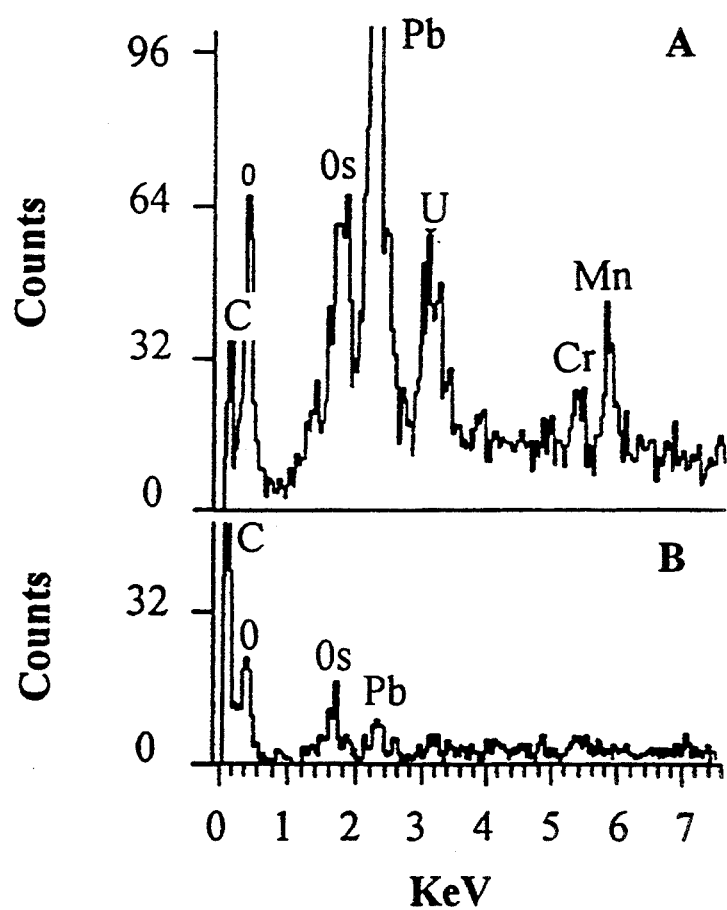
FIG. 9 shows EDX elemental analysis of colloidal $MnO^2$ deposits bound to polysaccharides of *P. manganicum*.

Mechanism of $MnO_2$ binding. Transmission electron-microscopy of ultra-thin sections of *P. manganicum* cells showed that the colloidal $MnO_2$ was bound to extracellular polymers (FIG. 8). The positive staining of these polymers by ruthenium red indicated that they were acidic polysaccharides. Ribbon-like particulate deposits typical of the appearance of δ-$MnO_2$ were bound to the surface of the extracellular acidic polysaccharides (FIG. 8). Elemental analysis of the bound deposits by EDAX confirmed the presence of manganese (FIG. 9). The heavy metals )s, Pb and U whose salts were used for staining the ultra-thin sections were observed to be strongly adsorbed to the $MnO_2$ deposits. The origin of the Cr is uncertain but was possibly a trace contaminant of the heavy metal salts. Electron microscopy (not shown) also confirmed that substantially more colloidal $MnO_2$ was bound to cells at ph4 than at pH7.

SECTION 4

The Adsorption and Oxidation of Manganese by Immobilised Cells of *Pedomicrobium manganicum*

INTRODUCTION

Work presented in the previous sections demonstrated that it was possible to immobilise cells of *P. manganicum* on magnetite particles and the *P. manganicum* cells were capable of adsorbing and binding $Mn^{2+}$ and $MnO_2$ respectively to surface components. Research in this section demonstrates that these properties can be exploited in a fluidised bed bioreactor to oxidise and remove $Mn^{2+}$ from water.

Disadvantages associated with using sand filters as packed-bed bioreactors include clogging and binding of particles as biomass develops (2).

In this section we report the results of research on a model fluidised-bed bioreactor for the adsorption and oxidation of manganese. The model utilises cells of the manganese-oxidising bacterium *Pedomicrobium manganicum* immobilised on particles of magnetite. *P. manganicum* has ideal characteristics for this application. Previous research has shown that P. Manganicum adheres strongly to surfaces and withstands high shear forces in water distribution systems (52), and actively adsorbs and oxidises manganese on extracellular components. In addition the extracellular acidic polysaccharides bind colloidal $MnO_2$ (50). Magnetite particles have been shown to rapidly adsorb a variety of microorganisms (33,34) without diminishing their metabolic activity (3), thus potentially reducing the start up period required when said is used as a support medium.

MATERIALS AND METHODS

Continuous recycle fluidized bioreactor (CRFB). The model CRFB (FIG. 10) consisted of a glass column 60 mm in diameter and 600 mm high through which medium was pumped into the bottom to fluidize 1.2 l magnetite particles of 212–300 μm diameter. The 50% expanded fluidized bed was maintained by recirculating a 3.3 l volume of medium through the column and a stirred mixing vessel containing 2.1 l which was aerated by 1 liter air per minute. Probes for pH, redox, and dissolved oxygen where included in the mixing vessel and temperature was maintained at 25° C. Dual synchronised peristatic pumps were used to recirculate the medium at a rate of 1 liter per min into and out of the column and mixing vessel. When operating in continuous mode synchronised peristatic pumps were used to pump in fresh medium and remove the same volume of effluent from the mixing vessel. The growth medium used was half strength PC medium (58) containing 0.0025% yeast extract. The total organic carbon content was determined as 12 mg/l. Manganese concentration was varied from 0.25 to 8.5 mg/l.

Figure 10A:
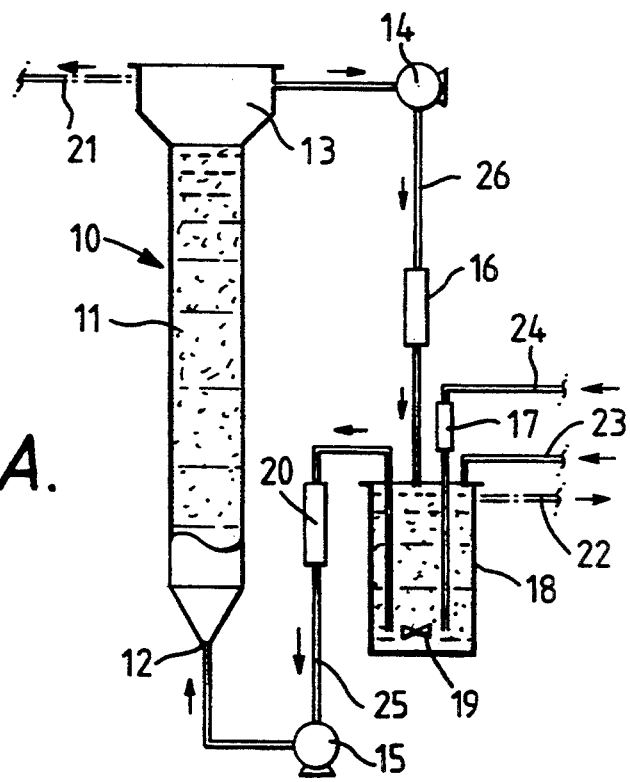
FIG. 10A is a schematic of a single continuous recycle fluidized bioreactor (CRFB) and associated flow conduits.
Figure 10B:
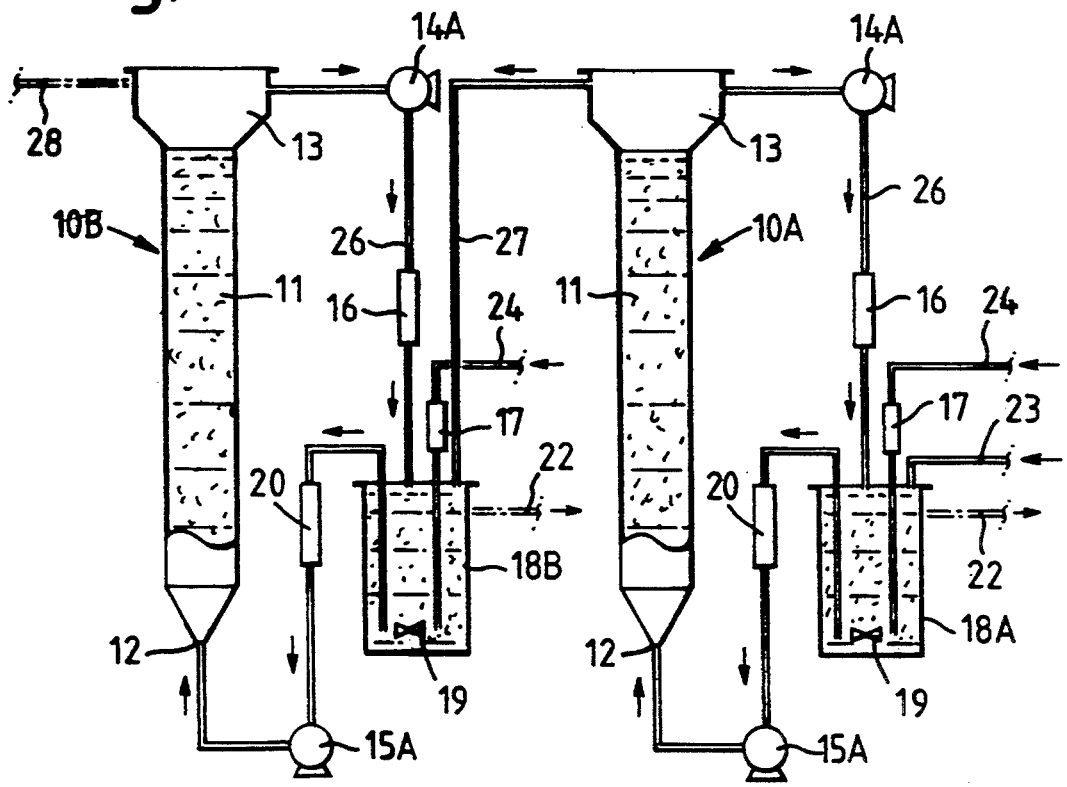
FIG. 10B is a schematic of a number of CRFBs in sequence and associated flow conduits.

With specific reference to FIGS. 10A and 10B, the CRFB 10 includes a long column 11 having a bottom inlet 12 and top part 13 of enlarged cross-section compared to the column 11. There is also provided peristatic pumps 14 and 15, liquid flow gauge 16, air flow gauge 17, mixing vessel 18, agitator 19 and bubble catcher 20. Effluent may be discharged from the top part 13 of the CRFB 10 as shown by line 21 in phantom or alternatively from mixing vessel 18 as also indicated by line 22 shown in phantom. Influent may enter mixing vessel 18 suitable through line 23 and air may enter the mixing vessel through line 24 through air flow gauge 17. Liquid may pass out of mixing vessel 18 through line 25, bubble catcher 20 and pump 15. Liquid may also pass from top part 13 of CRFB 10 and through pump 14 and air flow gauge 16, mixing vessel 18 through line 26.

In the arrangement shown in FIG. 10B, the mixing vessel 18A has influent entering through line 23 and air also entering through line 24 through air flow gauge 17. Also provided are peristatic pumps 14A and 15A with liquid entering the bottom inlet 12 of CRFB 10A and also exiting from top part 13 as an overflow through line 26 or also through line 27 to mixing vessel 18B and CRFB 10B wherein the process may be repeated whereby the overflow through line may proceed to further CRFBs (not shown).

Bacterial culture. The strain of microorganism used was *Pedomicrobium manganicum* UQM 3067 previously isolated from a water distribution system with manganese-depositing biofilm (51).

Magnetite. Crude ore obtained from Commercial Minerals was processed by sieving to the required size of 212–300 μm diameter. The magnetite particles were treated by eight alternating magnetic filed cycles (8AMF) sing the method of Mac Rae and Evans (33, 34). This treatment was carried out by mixing 1 volume of untreated magnetite with 4 volumes of 0.1M NaOH for 10 min followed by four ten minute washings with distilled water using decantation and then final readjustment to pH4 with 1M $H_2SO_4$. Decantation was facilitated by the use of a magnet to hold the magnetite in the base of the beaker. The magnetite was then passed through a demagnetising field (Eclipse AD960, England) to disperse the particles. This treatment process was repeated 8 times.

Immobilization jar tests. The adsorption of *P. manganicum* cells to 8AMF magnetite particles was studied in jar tests prior to immobilization in the CRFB. A 1% volume of settled magnetite was added to 200 ml cell suspension in immobilization suspending medium (33) in a 250 ml beaker and stirred at 250 rpm with a paddle stirrer for 10 min to keep the magnetite suspended and mixed. After cell adsorption the magnetite was allowed to settle for 2 min with the aid of a magnet. Dilutions of cell suspensions were made before and after adsorption and triplicate 0.1 ml samples were plated on PSM agar (20) to determine the number of unadsorbed cells. Agar plates were incubated at 28° C. for 10 days.

Immobilisation of cells in the CRFB. *P. manganicum* cells were harvested by centrifugation from a 4.5 l culture grown for 2 weeks at 28° C. in PSM broth medium (20). The cell pellet was washed twice in sterile immobilization suspending medium (33).

The CRFB was filled with 3.3 l sterile immobilization suspending medium. The washed cells were added to the mixing vessel which was stirred at 500 rpm to break up any cell clumps. To immobilize the cells the recirculation pump was turned on to fluidize the magnetite and to circulate the cells through the CRFB at a rate of 1 l per min. Immobilization was monitored by following absorbance at 540 nm and by taking samples for viable cell counts. After 20 min. two changes of suspending medium were made to remove unadsorbed cells and then the CRFB was filled with medium containing 1 mg/l $Mn^{2+}$.

Analysis of manganese. The porphyrin colorimetric method of Ishii et al, (29) was used to determine $Mn^{2+}$ concentrations in filtrates by measuring absorbance at 469 nm in 4 cm light-path cuvettes in a Unicam SP600 spectrophotometer (PYE Unicam Ltd, U.K.) and comparing with a standard curve using dilutions of manganese nitrate spectroscopy standard (BDH Chemicals), In $CuSO_4$ desorption experiments manganese was determined by flame atomic absorption spectrophotometry (AAS) using a Varian AA875 spectrometer because of interference with the porphyrin colorimetric method by the presence of $CuSO_4$. AAS was also used to determine total manganese and $MnO_2$ concentrations after digestion of samples in 11M HCl.

Adsorbed $Mn^{2+}$ was determined by the method of Bromfield and David (7), Samples were adjusted to pH4 using $0.1N$ $HNO_3$ and mixed with an equal volume of 10 mM $CuSO_4$ (pH 4.2) reagent to desorb adsorbed $Mn^{2+}$. The mixture was allowed to stand for 4 h an then filtered through a 0.1 μm membrane filter. Total $Mn^{2+}$ in the filtrate was determined by AAS and adsorbed $Mn^{2+}$ and residual $Mn^{2+}$ determined as above without $CuSO_4$ treatment.

Determination of surface area. Surface area analyses were carried out by the gas adsorption technique (10) with a Micromeretics RSAA 2205 surface area analyser using argon as the asorbate.

Total organic carbon. Samples were filtered through 0.1 μm membrane filters and then analysed in an ASTRO TOC Analyser.

Viable counts. Viable counts of *P. manganicum* were made from multiple dilutions ($10^{-2}$, $10^{-4}$, $10^{-6}$) of effluent samples and spread-plating triplicate 0.1 ml aliquots of each dilution on PC agar (58) plates. The gar plates were incubated at 28° C. for 14 days and examined for manganese-oxidizing bacteria. Viable counts were expressed as colony forming units (cfu).

Electron microscopy. The adsorption and adhesion of cells of *P. manganicum* to the surface of magnetite particles was examined by scanning electron microscopy. Magnetite particles from jar tests or from the fluidized bed of the CRFB were fixed in 1% glutaraldehyde in 0.1M phosphate buffer for 2 h and then dehydrated in a 25, 50, 85, 95 and 100% ethanol series. The particles were transferred to a 50% amylacerate-ethanol mixture and then into amylacerate. The preparations were critical print dried, sputter coated with gold in a partial argon atmosphere, and examined in a Philips SEM 505 scanning electron microscope.

Fluorescence microscopy. The attachment of cells to magnetite particles was observed by fluorescent microscopy with an Olympus BHB fluorescent microscope after staining with acridine organ (5 -$\mu$g/ml).

RESULTS

Adsorption of *P. manganicum* to magnetite. Research presented in Section 1 demonstrated that it wa possible to adsorb cells to magnetite particles and that the cells adhered strongly. The results presented in Table 11 demonstrate the adsorption of cells to volumes of magnetite of the ratio to be use din the CRFB. The results how that it was possible to scale up the magnetite volume but that there was a reduction in particle coverage from approximately 27 cells/$10^4$ $\mu$m$^2$ at 1% magnetite to 1 cell/$10^4$ $\mu$m$^2$ at 45% magnetite. A jar test to mode the CRFB using 36% magnetite (Table 12) estimated that he fluidized bed of the bioreactor would be loaded with 5.7×$10^6$ cells epr ml magnetite with a coverage of 3 cells/$10^4$ $\mu$m$^2$.

Figure 11:
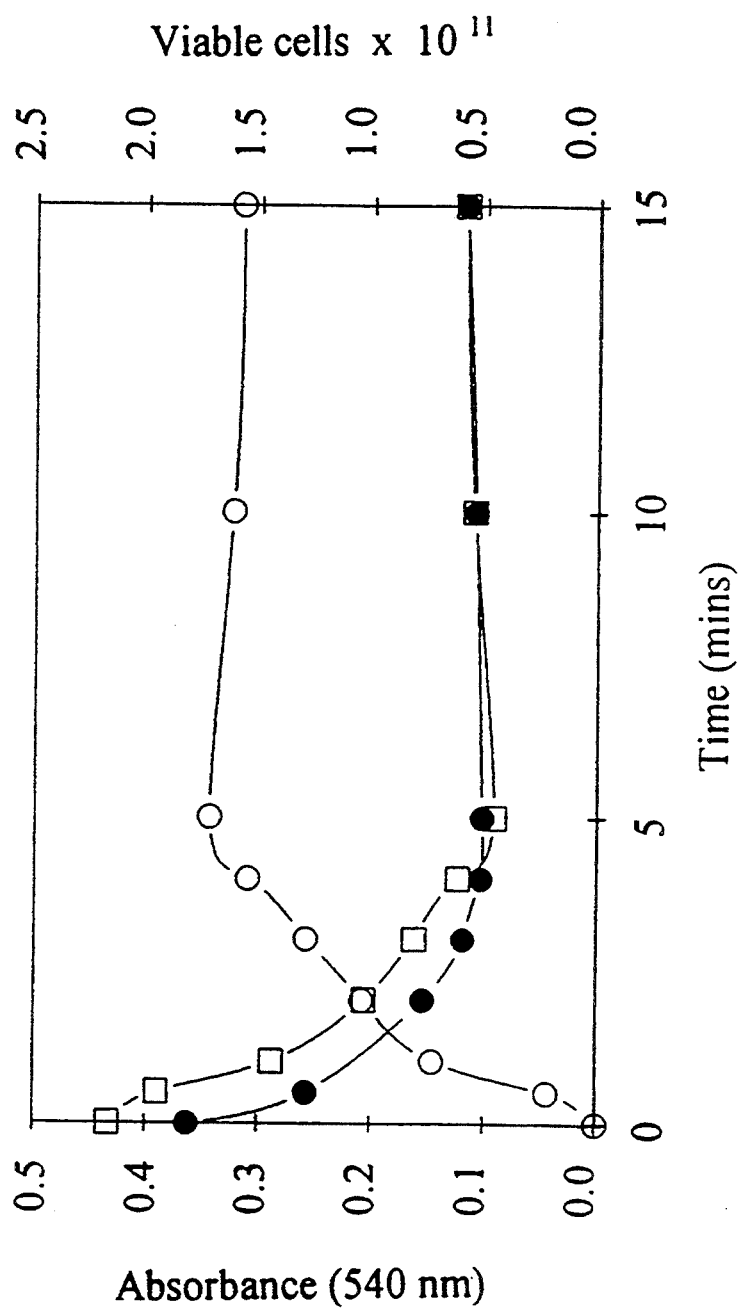
FIG. 11 is a graph showing immobilization of *P. manganidum* cells in magnetite particles (CRFB).
Figure 12:
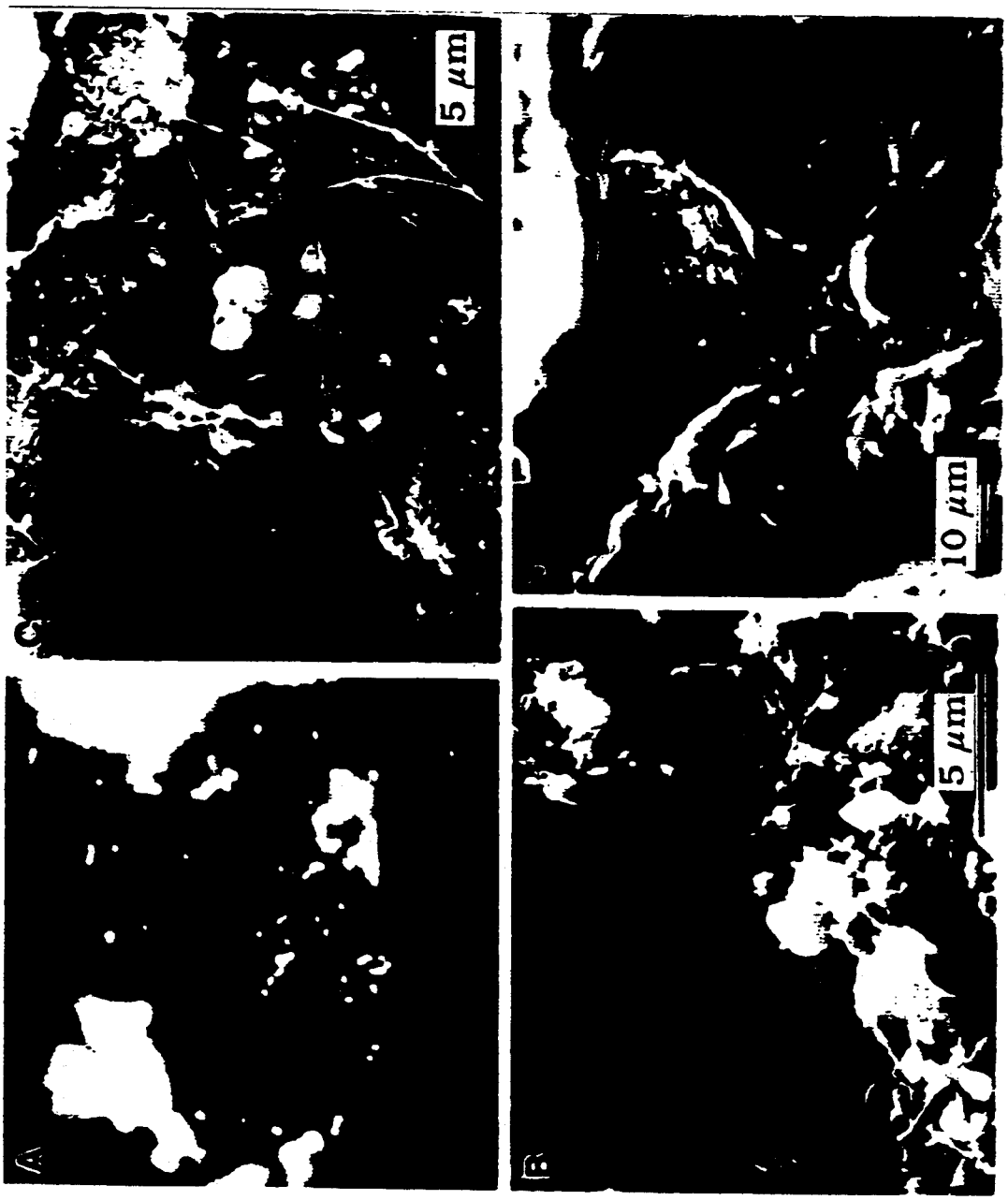
FIG. 12 shows various fluorescent micrographs of immobilized cells of *P. manganicum* on magnetite particles.

Immobilisation of *P. manganicum*. Immobilisation of cells in the CRFB closely followed the predictions of the jar tests. The jar test (Table 12) predicted a loading of 6.8×10'' cells on the 1200 ml of fluidized magnetite in the CRFB. The actual result was 1.6×10'' which was of the same order and provided a coverage of about 1 cell/$10^4$ $\mu$m$^2$. Immobilization occurred rapidly and was complete in 5 min. (FIG. 11) as predicted. Observations by fluorescent microscopy and scanning electron microscopy confirmed the immobilization of the cells on the magnetite particles (FIG. 12). The majority of cells were located in depressions in the magnetite particulars indicating that the fluidizing conditions of approximately 20 m/h may be too high for an even coverage because of the abrasive action of colliding particles.

Figure 13:
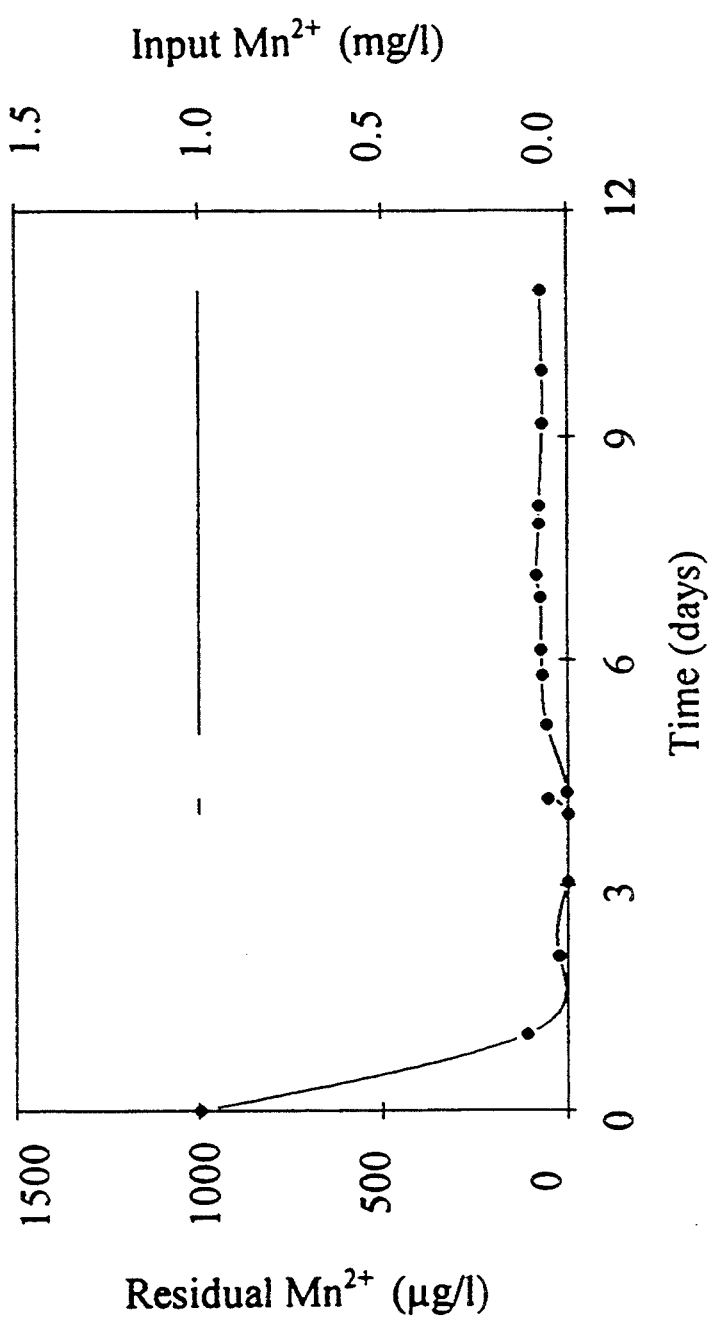
FIG. 13 is a graph showing removal of 1 mg/l $Mn_{2+}$ immediately after immobilization of *P. manganicum* cells by the CRFB.

Bioreactor startup. Immediately after immobilisation the CRFB was flushed with immobilisation medium to remove unadsorbed cells and then filled with medium containing 1 mg/l Mn$^{2+}$. The CRFB was operated in batch mode for four days. The residual Mn$^{2+}$ was reduced to zero in 3 days with approximately 90% of residual Mn$^{2+}$ being removed on each successive day (FIG. 13). The CRFB was challenged with a 5 h pulse of 1 mg/l Mn$^{2+}$ at a feed rate of 158 ml/h (=21 h residence time). The residual Mn$^{2+}$ rose to 53 $\mu$g/l and then fell away to zero in 3 hours.

The CRFB was then operated continuously with a 1 mg/l Mn$^{2+}$ feed for 6 days. The residual Mn$^{2+}$ level quickly reached a steady state level of approximately 71 $\mu$g/l, a reduction of 93% at a residence time of 21 h.

Figure 14:
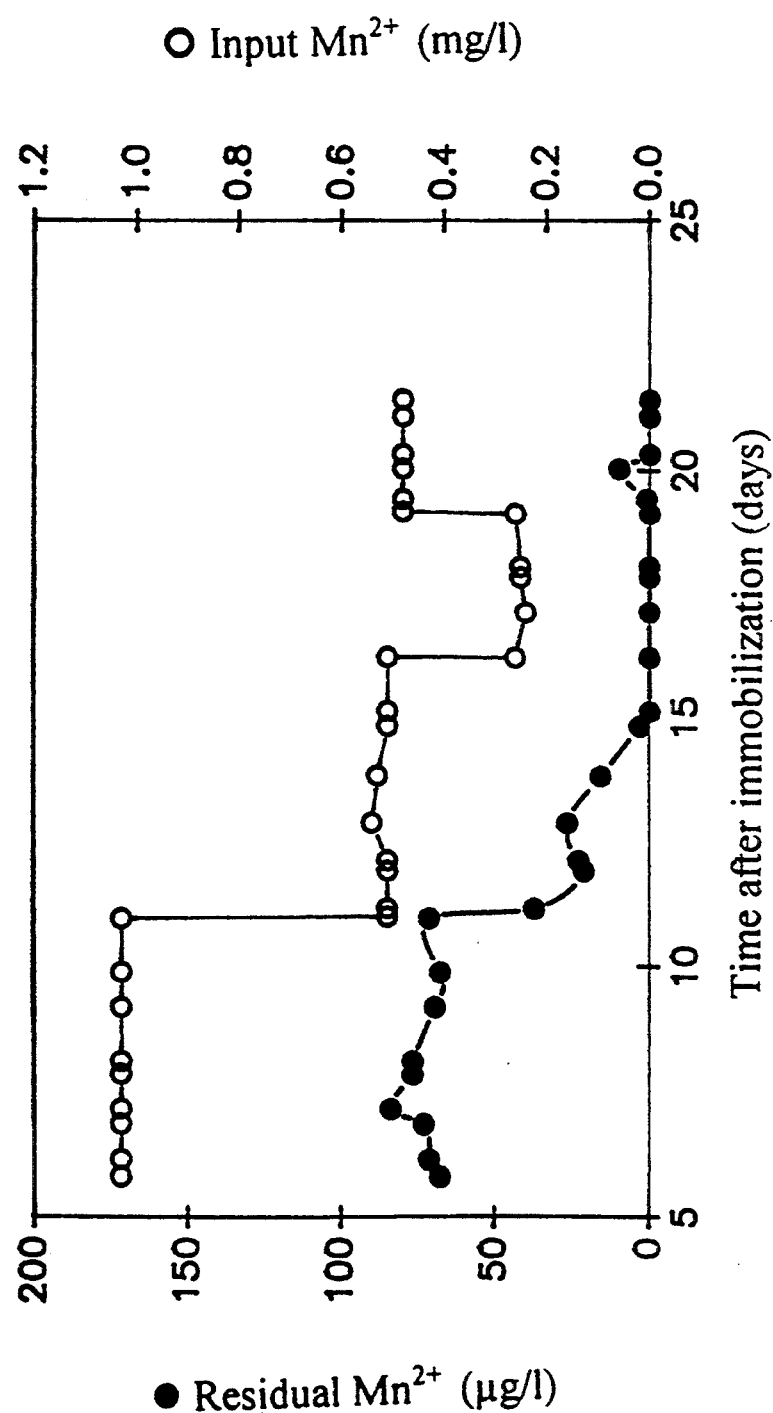
FIG. 14 is a graph showing effect of decreasing $Mn^{2+}$ concentrations on $Mn^{2+}$ removal by the CRFB immediately after immobilization of cells.
Figure 15:
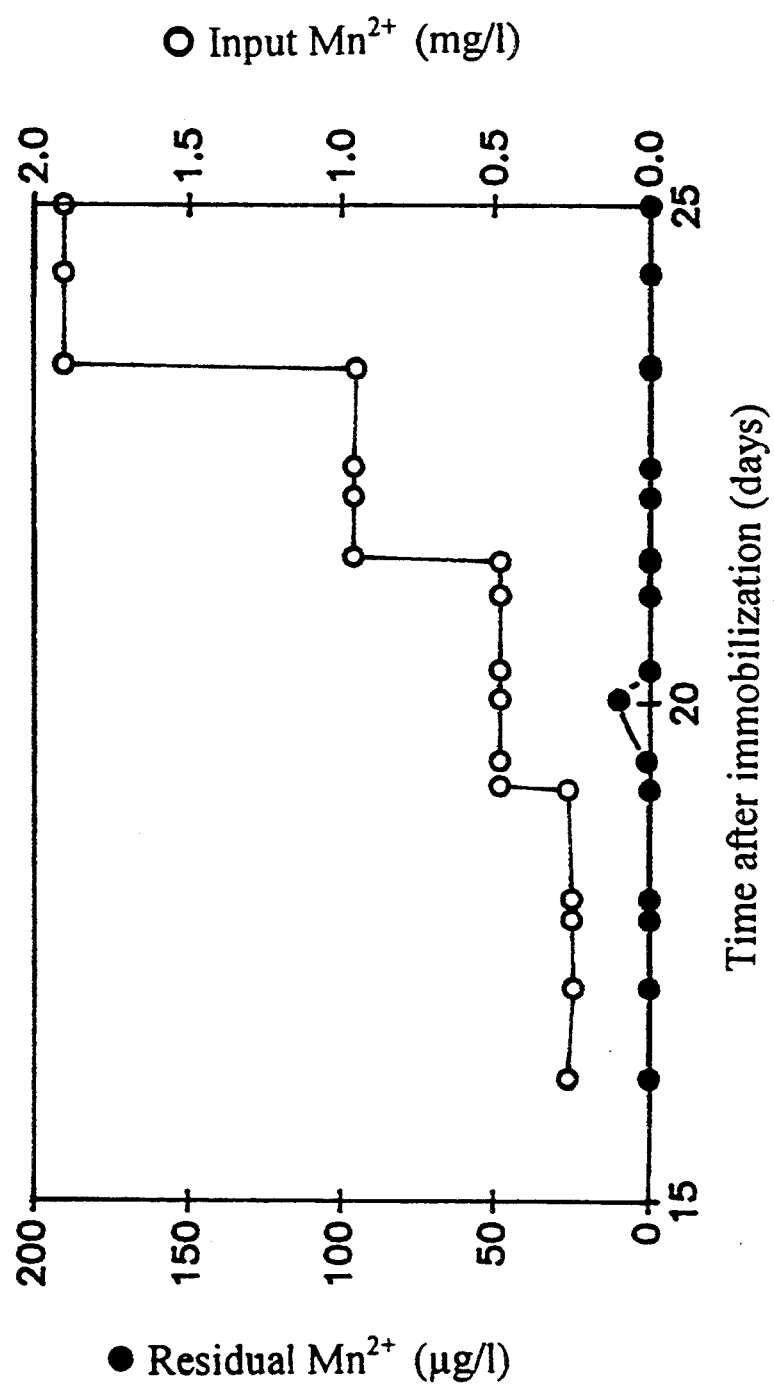
FIG. 15 is a graph showing effect of increasing $Mn^{2+}$ concentrations on $Mn^{2°}$ removal by the CRFB immediately after immobilization of cells.

Effect of Mn$^{2+}$ concentration on manganese removal. After operation of the CRFB at 1 mg/l Mn$^{2+}$ for 6 days the manganese input was reduced to 0.5 mg/l. The residual Mn$^{2+}$ fell from 71 $\mu$g/l to 25 $\mu$g/l and with improvement in removal performance subsequently reduced to zero after 14 days (FIG. 14). Improvement in removal performance over that immediately after immobilization was demonstrated by a stepwise increase in input Mn$^{2+}$ concentrations up to 2 mg/l. The residual Mn$^{2+}$ level remained at zero (FIG. 15).

Figure 16:
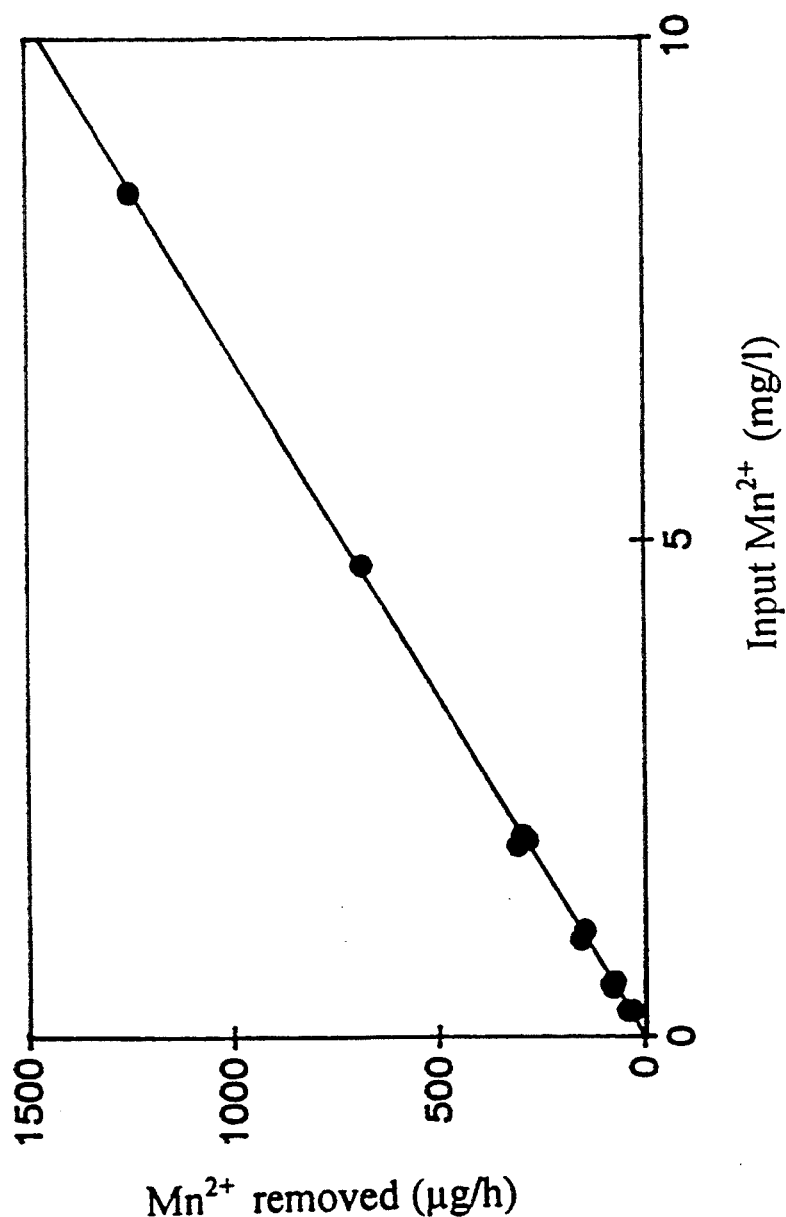
FIG. 16 is a graph showing effect of $Mn^{2+}$ concentration on the removal rate of $Mn^{2+}$ by the CRFB.

Manganese concentration experiments were conducted over a five month period. The removal performance fell away from the initial 100% to around 90-93% for concentrations between 1 and 8.5 mg/l Mn$^{2+}$ respectively (Table 13). Over the range of 0.25 to 8.5 mg/l Mn$^{2+}$ there was a linear relationship between manganese concentration and the manganese removal rate (FIG. 16).

The results presented in Table 14 show that the major part of the residual manganese was Mn$^{2+}$ with only low levels of adsorbed Mn$^{2+}$ and oxidised manganese in the effluent. This indicates that the majority of the adsorbed and oxidized Mn$^{2+}$ remained on the immobilized cells in the column.

Figure 17:
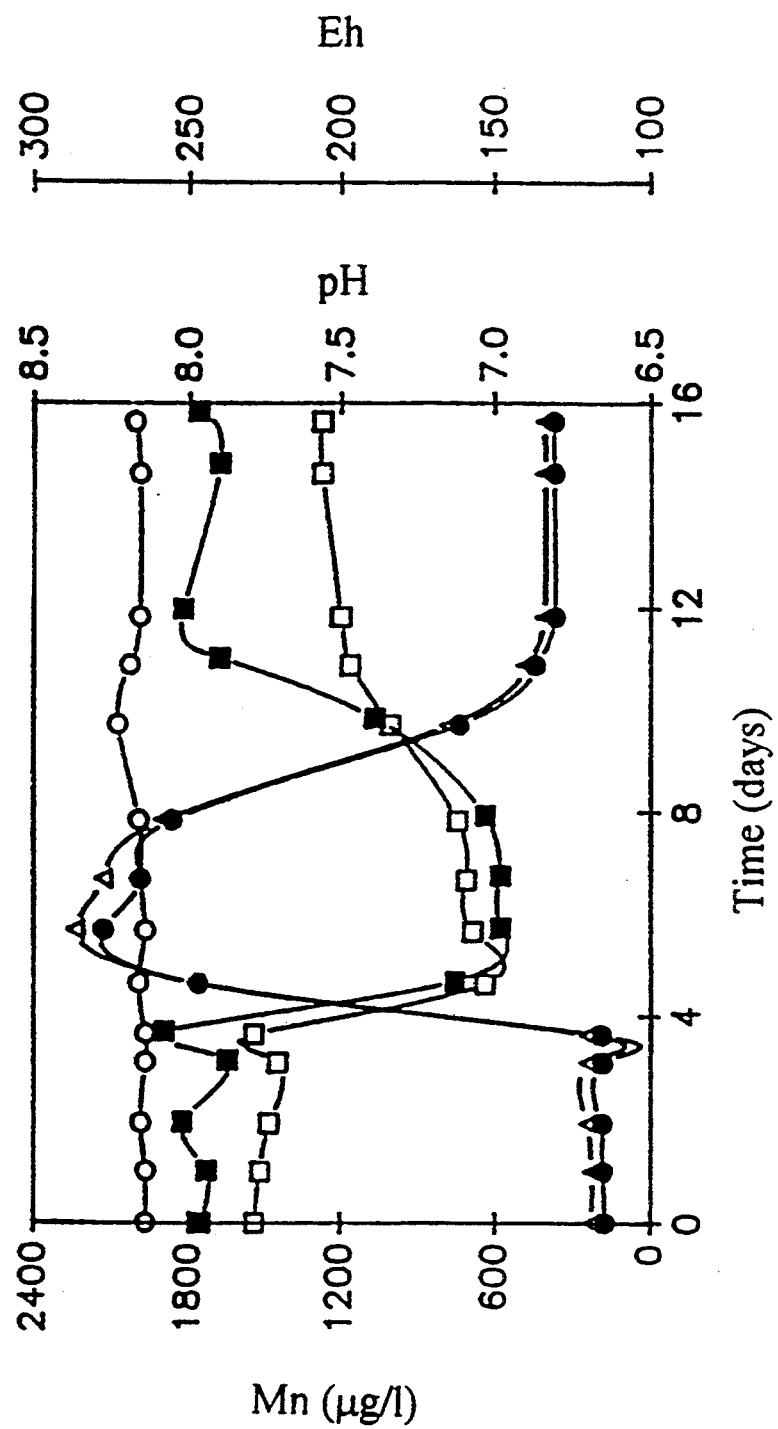
FIG. 17 is a graph showing effect of pH control at pH 7 on $Mn^{2+}$ removal showing changes in input $Mn^{2+}$, residual $Mn^{2+}$, total residual Mn, pH and Eh.
Figure 18:
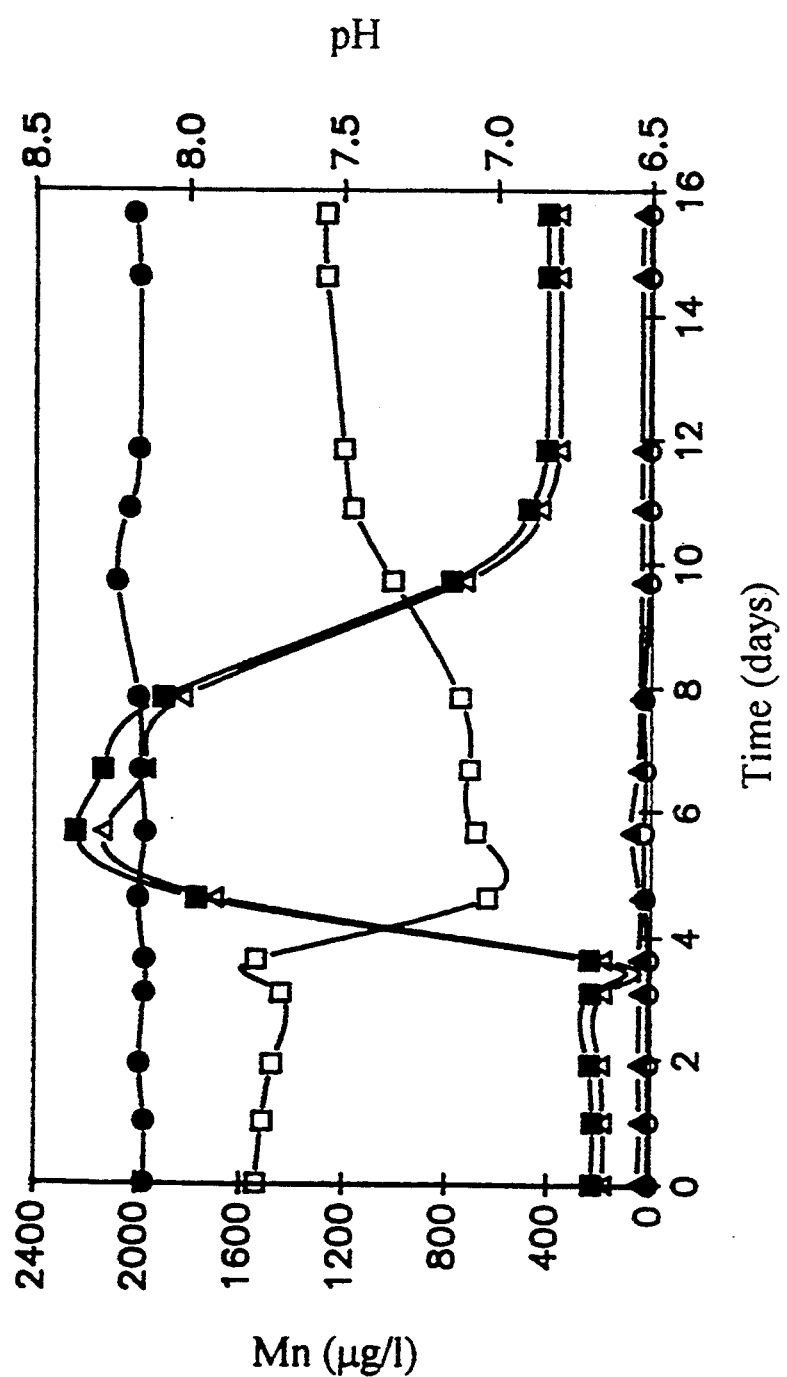
FIG. 18 is a graph showing effect of pH control at pH 7 on $Mn^{2+}$ conversion showing changes in pH, input $Mn^{2+}$ and effluent levels of total Mn, soluble Mn, adsorbed Mn and MnOx.

Effect of pH on Mn$^{2+}$ removal. A series of experiments were conducted to study the effect of pH conditions for manganese removal. Under uncontrolled pH conditions with a pH 7 feed, the effluent pH was maintained by metabolic activity around pH 7.8. Controlling pH at 7 (FIGS. 17 & 18) from day 4 to day 8 resulted in cessation of Mn$^{2+}$ removal, and there was evidence of some desorption of Mn$^{2+}$ from the column as indicated by effluent Mn levels slightly above the feed concentration. After uncontrolled pH conditions were resumed, the effluent pH readjusted metabolically to approximately 7.6 and Mn$^{2+}$ removal returned to slightly above the initial level where the pH was 7.8. The reducing conditions during control at pH 7 were also reflected in lower Eh levels.

Figure 19:
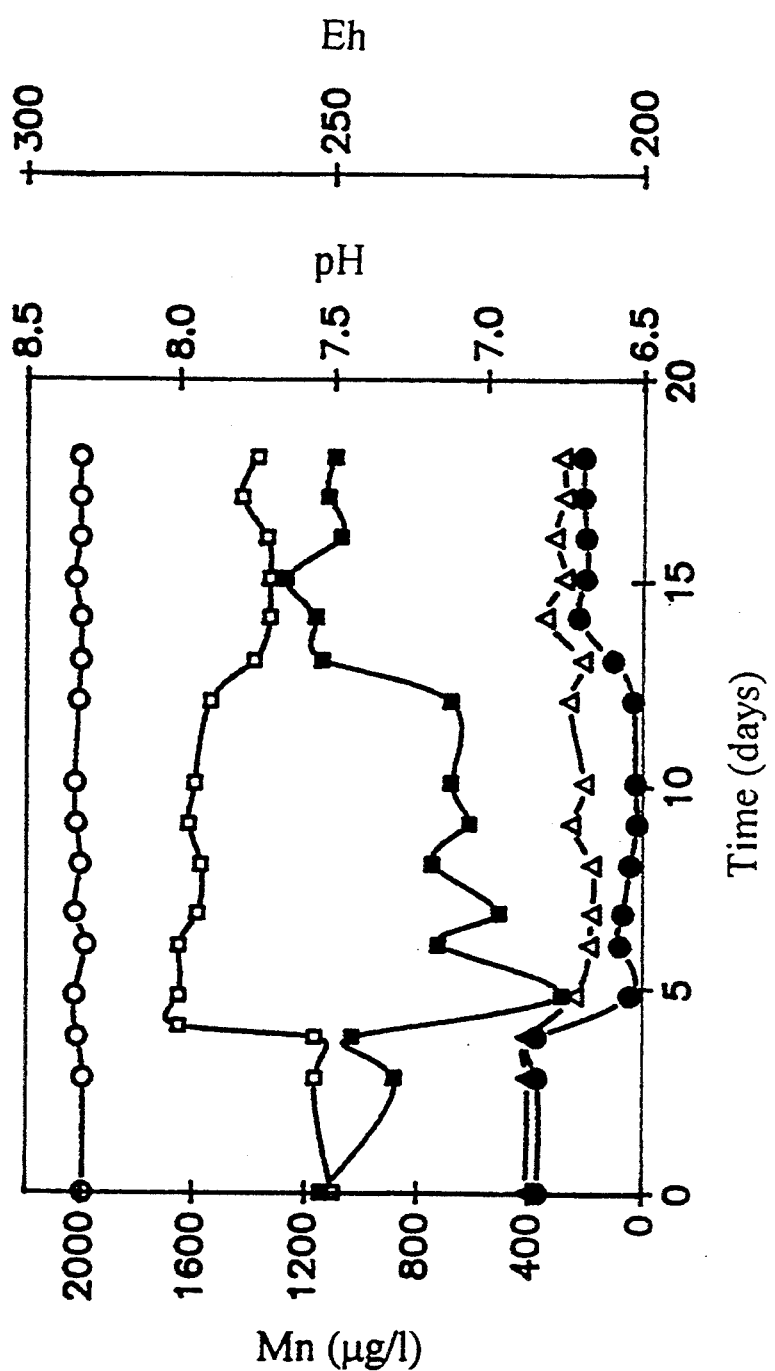
FIG. 19 is a graph showing effect of pH control at pH 8 and pH 7.8 on $Mn^{2+}$ removal showing changes in input $Mn^{2+}$, residual $Mn^{2+}$, total residual Mn, pH and Eh.
Figure 20:
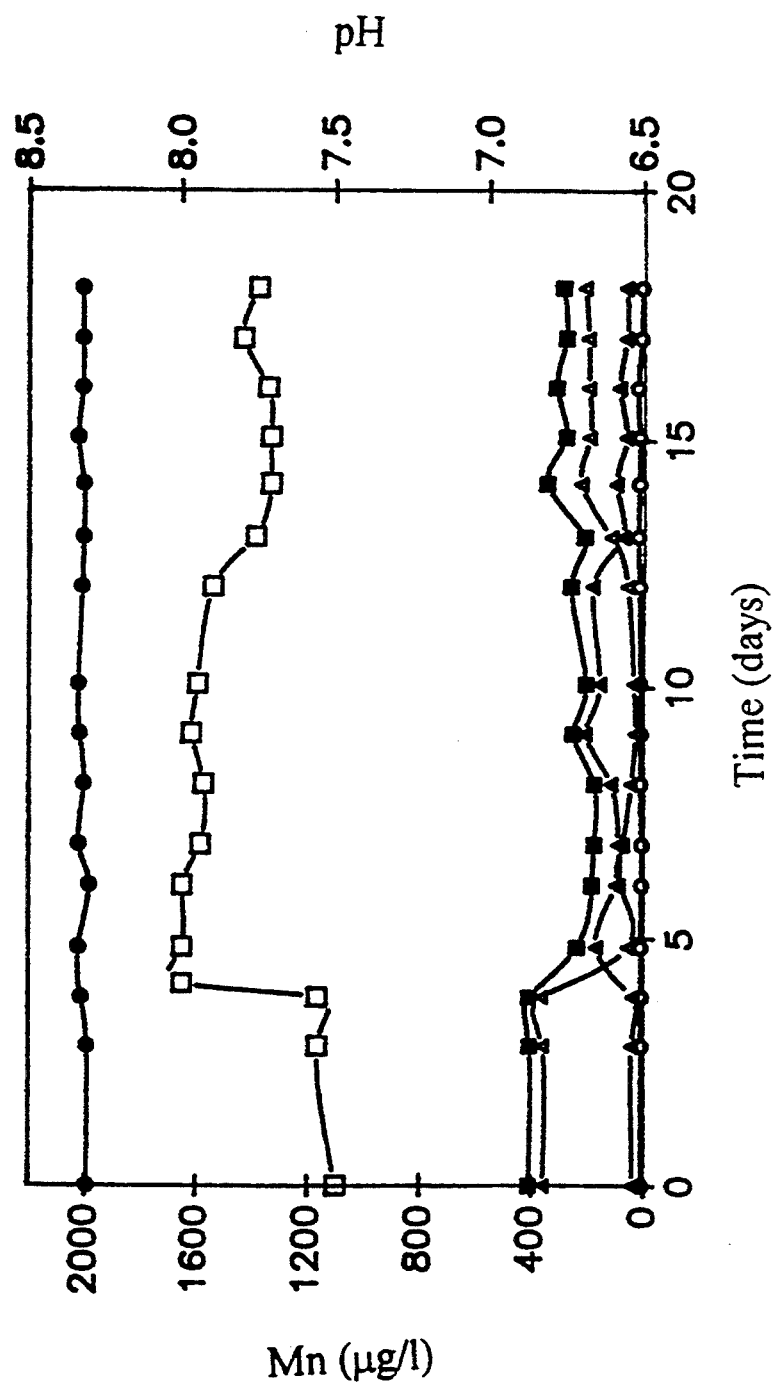
FIG. 20 is a graph showing the effect of pH control at pH 8 and pH 7.8 on $Mn^{2+}$ conversion showing changes in pH, input $Mn^{2+}$, and effluent levels of total Mn, soluble Mn, adsorbed Mn and MnOx.
Figure 21:
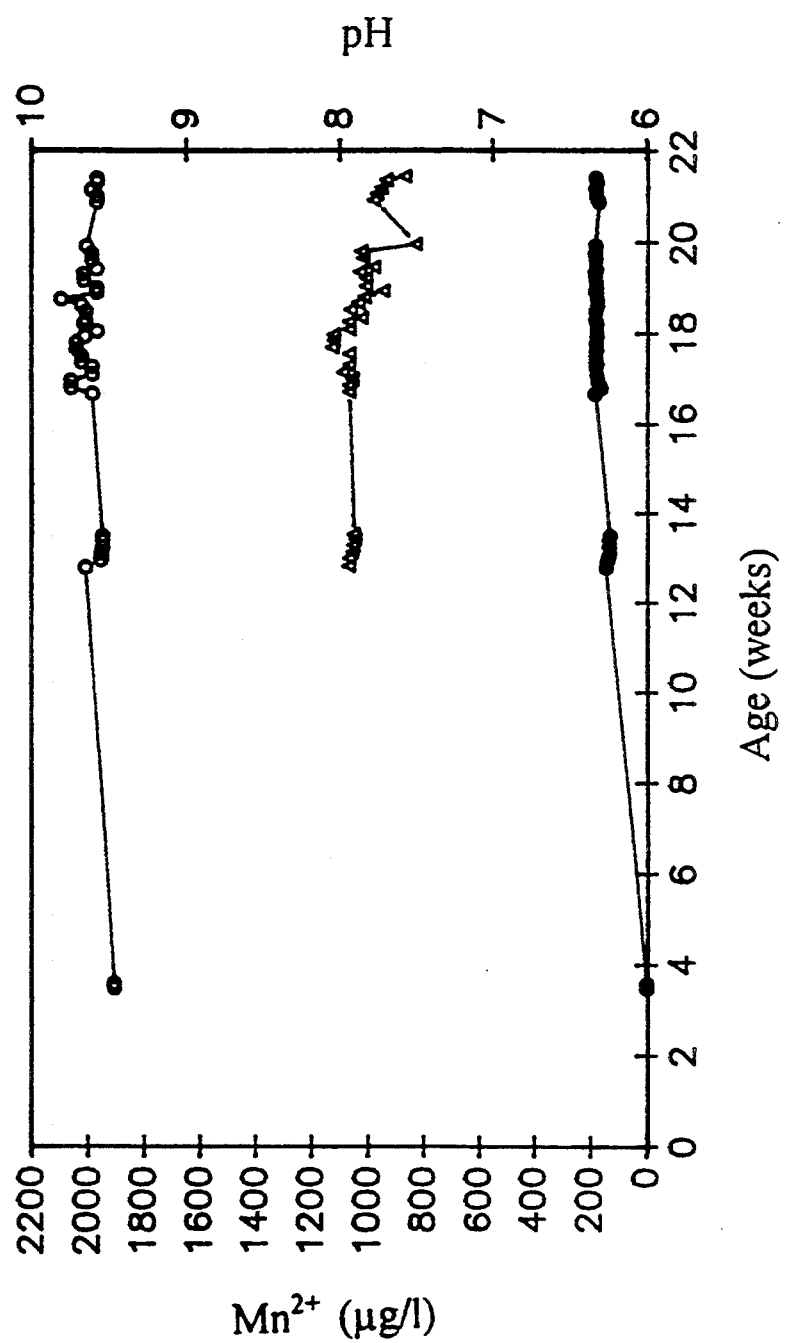
FIG. 21 is a graph showing the effect of age on the removal of 2 mg/l $Mn^{2+}$ by the CRFB operated at an influent pH of 7 and a residence time of 21 h showing changes in input $Mn^{2+}$, residual $Mn^{2+}$ effluent pH.
Figure 22:
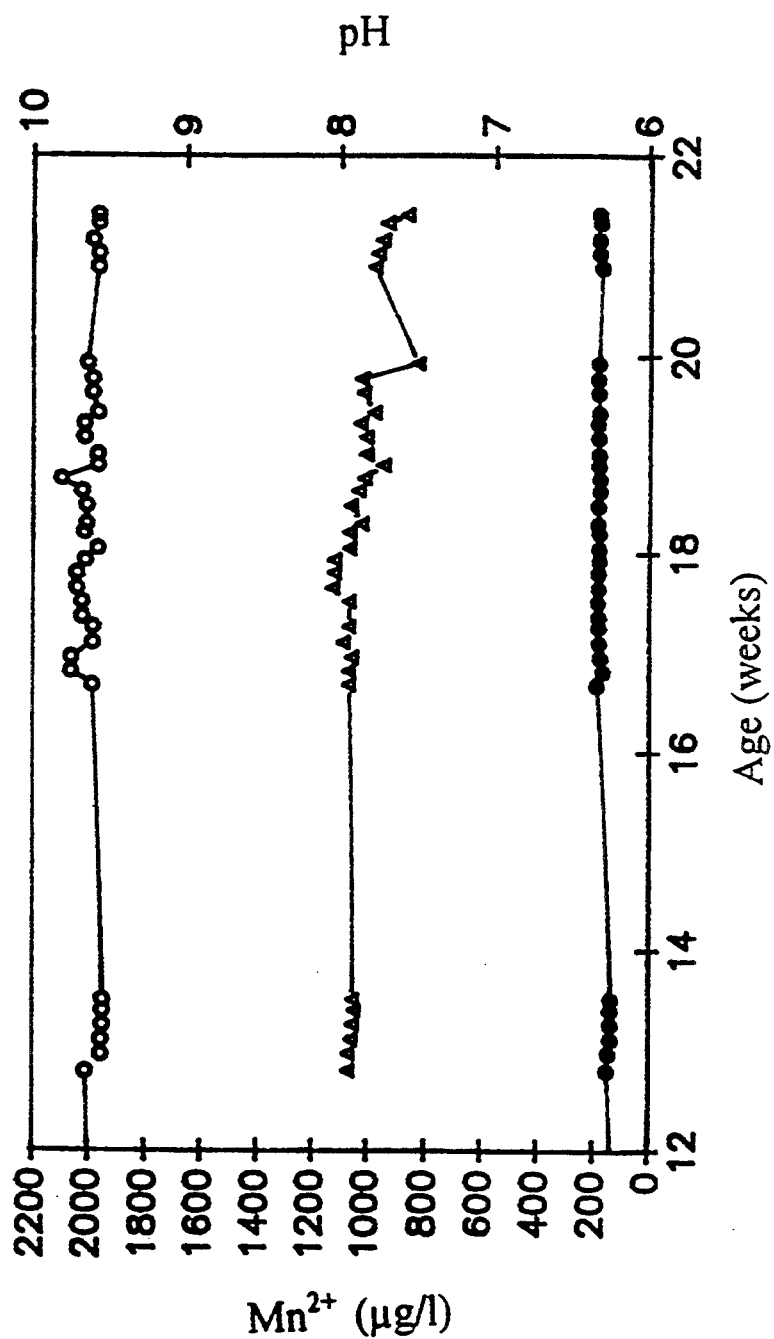
FIG. 22 is a graph showing the effect of age on the removal of 2 mg/l $Mn^{2+}$ by the CRFB operated at an influent pH of 7 and a residence time of 21 h showing changes in input $Mn^{2+}$, residual $Mn^{2+}$ effluent pH.
Figure 23:
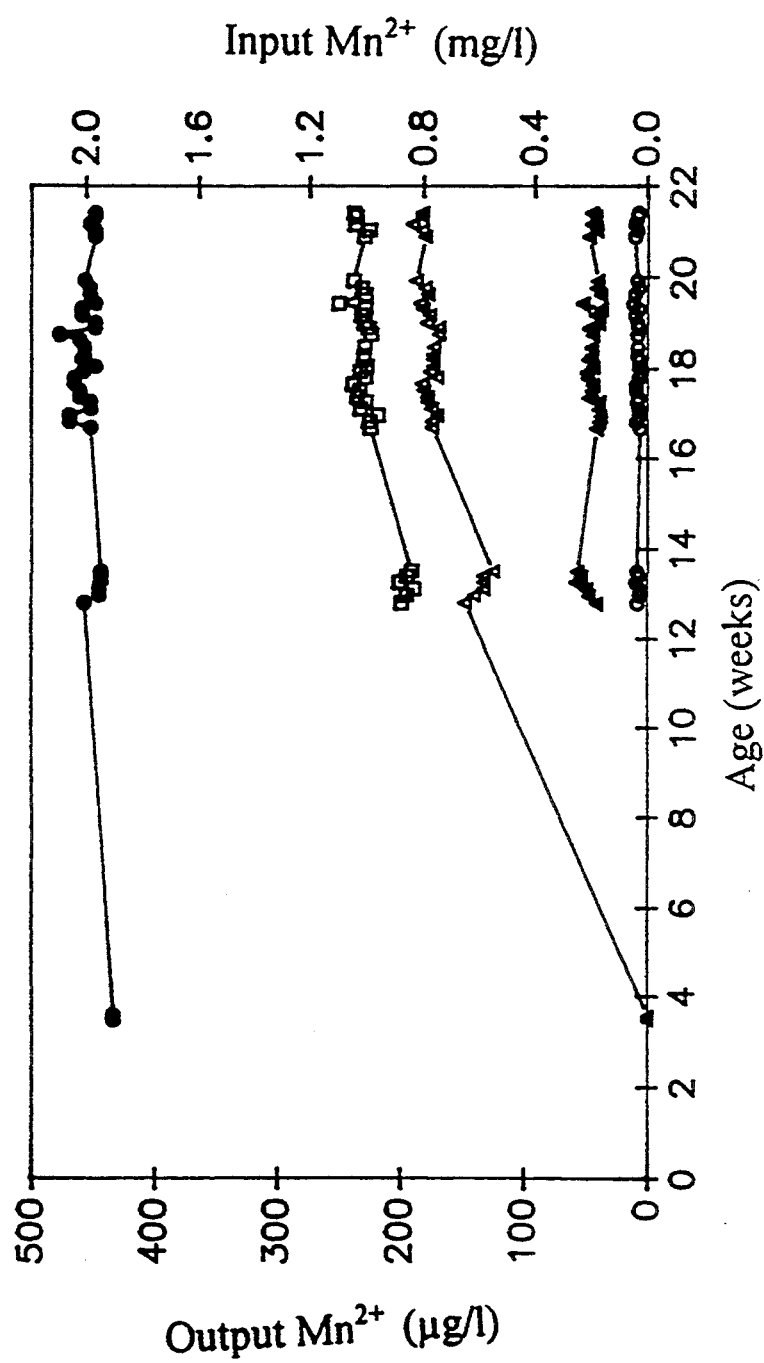
FIG. 23 is a graph showing the effect of age on the conversion of 2 mg/l $Mn^{2+}$ by the CRFB operated at an influent pH of 7 and a residence time of 21 h showing changes in input $Mn^{2+}$ and effluent levels of total Mn, soluble Mn, adsorbed Mn and MnOx.
Figure 24:
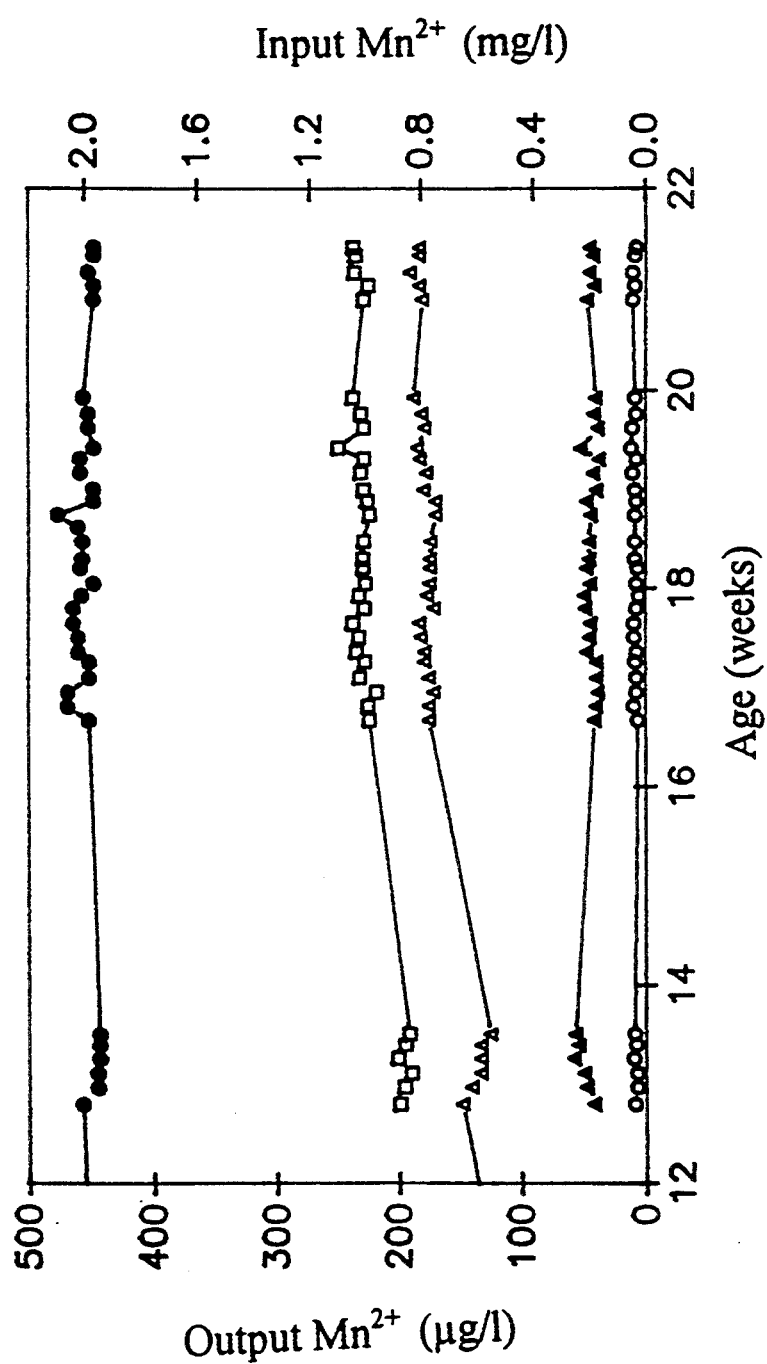
FIG. 24 is a graph showing the effect of age on the conversion 2 mg/l $Mn^{2+}$ by the CRFB operated at an influent pH of 7 and a residence time of 21 h showing changes in input $Mn^{2+}$ and effluent levels of total Mn, soluble Mn, adsorbed Mn and MnOx.

It appeared that manganese removal performance was favoured by alkaline conditions normally adjusted by the metabolic activity of the cells to around pH 7.8. Control of pH at pH 8 resulted in improved Mn$^{2+}$ and total Mn removal (FIGS. 19 & 20, Tables 15 & 16). At pH 8 the majority of the effluent manganese was oxidised, probably as a result of the chemical oxidation of the resifual Mn$^{2+}$ by NaOH dosing for pH control. Control at pH7.8 reduced the chemical oxidation while only marginally affecting the Mn removal rate. The reason for the drop in Eh during pH control at pH 8 is uncertain at this stage.

Effect of cell age on manganese removal. The results presented in FIGS. 21-24 and Table 17 show that the CRFB operated consistently over a period of 22 weeks. There was an initial drop in removal rate between 1 and 3 months after which the removal rate remained between 92% and 93%. The pH was maintained merabolically by the cells at around pH 7.8 but began to drop away slightly after 20 weeks indicating a sligh loss of metabolic activity.

DISCUSSION

The results clearly demonstrate the successful immobilization of *P. manganicum* on magnetite particles and their use in a continuous recycle fluidized bioreactor for the removal of manganese from water. The CRFB operated for 22 weeks with removal rates of greater than 90% and up to 100% for Mn$^{2+}$ concentrations up to 8.5 mg/l when operated at a residence time of 21 h. The majority of the manganese in the effluent was residual Mn$^{2+}$ with only low levels of oxidised and adsorbed manganese. As was hypothesised the bulk of the oxidised manganese remained attached to the immobilized cells in the column. The bioreactor approached maximum removal efficiency within a week compared with approximately 15 weeks for sand filters relying on colonization by natural populations of manganese oxidizing bacteria (18). The CRFB required minimal maintenance, did not clog or bing and therefore did not require back washing which is a disadvantage with sand filters.

The pH conditions were critical for manganese adsorption, oxidation and removal. Optimal conditions were found to be around pH 7.8 which interestingly is the pH naturally produced by *P. manganicum* through merabolic activity when grown with a feed pH of 7. Controlling the pH at 7 resulted in a complete cessation of manganese oxidation. The reason for this dramatic impact is unclear at this stage but probably is concerned with the machanism of manganese oxidation rather than adsorption and desorption which is not affected by a change in pH form 8 to 7 with *P. manganicum* (FIG. 6). Various mechanisms for manganese oxidation have been proposed including specific enzymes or simply the creation of local high pH environment around the cells. It is unlikely that an enzyme would exhibit such a sharp decrease in activity. It is more likely that controlling the pH at 7 neutralyses the alkaline environment around the cells thus eliminating the essential conditions for manganese oxidation. Further work will be required to elucidate this matter.

The experimental results clearly show that surface components of *P. manganicum* are significant reservoirs of $Mn^{2+}$. The most likely surface components are $MnO_2$ and extracellular polysaccharides and proteins. Viable cells of *P. manganicum* adsorbed more than twice the amount of $Mn^{2+}$ compared with autoclaved cells which essentially behaved as particulate abiological $MnO_2$ indicated that the extracellular components are heat labile. Data show that at pH8 approximately 45% of the $Mn^{2+}$ was adsorbed to the surface $MnO_2$ and 55% to the extracellular components.

The results have also shown that the extracellular components of *P. manganicum* stabilise the adsorption of $Mn^{2+}$ to the cells at low pH. Whereas desorption of $Mn^{2+}$ from abiological $MnO_2$ or autoclaved cells of *P. manganicum* was complete at pH4, very little $Mn^{2+}$ was desorbed from the viable cells at that pH.

The inhibition experiments failed to elucidate the chemical nature of the extracellular components. However, their adsorptive/desorptive behaviour for $Mn^{2+}$ can be explained in terms of the expected effect of pH on polysaccharides which have been shown in *Pedomicrobium sp.* to be acidic polysaccharides [23]. Above their isoelectric point, acidic polysaccharides are polyanionic [27] and would be expected to strongly adsorb the oppositely charged $Mn^{2+}$ ions. As the pH is lowered the net negative charge on the surface of the polysaccharides would decrease and the $Mn^{2+}$ would be expected to desorb. Comparison of the pH desorption profiles for viable cells and abiological $MnO_2$ suggests that charge reversal occurs aroun pH4. This finding is upported by experimental results which show that binding of negatively charged colloidal $MnO_2$ to the acidic polysaccharides of *P. manganicum* is enhanced by lowering the pH to 4 [50] In contrast the surface complexes formed by adsorption of $Mn^{2+}$ ions are more easily displaced by protons.

Ghiorse and Hirsch [23] reported that bactericidal treatments of concentrated cell suspensions of *Pedomicrobium sp.* with 1 mM $HgCl_2$ and 0.05% glutaraldehyde failed to completely inhibit manganese oxide deposition, and that this was in conflict with the results of growth experiments in which manganese oxidation was completely inhibited by the same treatments. However, it is clear from our results that the ability to adsorb $Mn^{2+}$ is also not inhibited by the same bactericidal treatments, not by 10 mM $NaN_3$ or protease enzyme. From these results it may be concluded that although manganese oxidation is dependent on proteins, adsorption of $Mn^{2+}$ is not. From the work of Ghiorse and Hirsch [23] it appears likely that the first step in manganese oxidation by *Pedomicrobium sp.* is the adsorption of $Mn^{2+}$ to acidic polysaccharides. The concept of a two stage process for microbial manganese oxidation has been well established in pure culture and environmental studies [7,11,30,54] and that oxidation is the rate limiting step. The lack of any effect on the $Mn^{2+}$ adsorptive process of *P. manganicum* by protein inhibitors such as protease, $HgCl_2$ and glutaraldehyde, and by metabolic inhibitors such as $NaN_3$ suggests that the mechanism of adsorption is ionic and this is supported by the pH dependence on adsorptive capacity.

The necessity when studying-manganese transformation to take into account its specification and adsorption to particulate matter is essential. Various cation exchange methods have been devised to desorb and estimate adsorbed $Mn^{2+}$. It is clear from our results that not all methods are suitable for desorption of $Mn^{2+}$ from *P. manganicum* and possibly other microorganisms probable because of the stabilising influence of the extracellular acidic polysaccharides. The $MgSO_4$ (pH7) method performed poorly with *P. manganicum* desorbing 0% and 1.5% for 10 mM $MgSO_4$ and 20 mM $MgSO_4$ respectively. Lowering the pH to 4 increased the desorption to only 2.2% and 3.4% respectively. The $CuSO_4$ (pH4.2) method of Bromfield and David [7] developed to desorb $Mn^{2+}$ from *Arthrobacter sp.* performed very will also with *P. manganicum* cells and reproducibly desorbed 96% of the adsorbed $Mn^{2+}$. The modified method [8] using 10 mM $CuSO_4$ in 1M ammonium acetate at pH7 was slightly less effective than 10 mM $CuSO_4$ at pH4.2. For maximum desorption from *P. manganicum* it was found necessary to lower the pH of the cell suspension to pH4 before adding the $CuSO_4$ reagent. Increasing the $CuSO_4$ to 20 mM did not increase desorption. The reason for the better performance of $CuSO_4$ over $MgSO_4$ for ionic exchange of $Mn^{2+}$ from the $MnO_2$ and extracellular polysaccharides is not clear but it is most likely due to the properties of the acidic polysaccharides (for example, the Cu complexes of the carboxyl groups may be stronger than the corresponding complexes with Mg and Mn). An additional advantage of using $CuSO_4$ in microbial systems is the toxicity of $Cu^{2+}$ for the manganese oxidation step [7] which also allows the use of the reagent to stop the reaction when the sample is taken. Kepkay et al. [30] concluded that the $CuSO_4$ desorption method [7] used to distinguish among adsorbed, ion-exchanged, and oxidised manganese was "approximate at best". However, Kepkay et al. [30] also concluded that there is currently no better method for determining the oxidation state of particulate manganese. Our results confirm this conclusion for *P. manganicum* but have also shown that the method is efficient and reproducible provided the sample is first adjusted to pH4.

It is clear from this invention that the extracellular polysaccharides of *P. manganicum* are an important reservoir of $Mn^{2+}$ in the CRFB, possible accounting for more than half the $Mn^{2+}$ on the surface of manganese-oxidising microbial cells in conditions where manganese oxidation is incomplete and residual $Mn^{2+}$ remains.

The results presented have shown that the extracellular acidic polysaccharides of *P. manganicum* are also able to bind pre-formed colloidal manganese oxide. The mechanism of MnO$_2$ binding to the extracellular polysaccharides is speculative at this stage but must involve the surface formation of specific manganese complexes with carbohydrate groups of the extracellular polysaccharide. The phenomenon of metal binding by polyelectrolytes has long been recognised and many workers have shown the complexing of divalent metal ions with polyanions especially those with carboxyl groups. Thus it is believed that the extracellular polysaccharide attached itself to the surface of colloidal metal oxide particles.

The enhancement of binding as the pH was decreased suggested that surface charges and ionic attraction may also be involved. Published date indicates that pH influences the surface charge of both $\delta$-MnO$_2$ (28,36,39) and extracellular acidic polysaccharides, which have a likely pKa of between 4 and 5 (21,45).

The surface sites of colloidal hydrous $\delta$-MnO$_2$ have amphoteric properties (36). The isolectric point for colloidal hydrous $\delta$-MnO$_2$ ranges from 2.8 (36) down to 1.5 (28). Within the pH range of 4 to 7 examined in this study colloidal $\delta$-MnO$_2$ is negatively charged.

The extracellular polymers to which the colloidal MnO$_2$ was bound were stained by ruthenium red which indicated that they were polyanions in nature (27). The most likely composition of these anionic polymers is acidic polysaccharides (23). It would be expected that the number of ionised carboxyl groups ton the acidic polysaccharides would be decreased by protonation as the pH was lowered.

Consideration of the fact that the $\delta$-MnO$_2$ was negatively charged under the experimental conditions suggests that the marked increase in MnO$_2$ binding between pH5 and 4 was due then to a decrease in the net negative charge of the acidic polysaccharide.

The ability of *P. manganicum* to bind preformed MnO$_2$ may be used in the CRFB to remove particulate manganese from water which may pass through sand filters.

From the foregoing it will be appreciated that the process of the invention may also be applied to a commercial plant using a single CFRB or a multiplicity of CFRBs as shown in FIGS. 10A and 10B. The sequential arrange of bioreactors shown in FIG. 10B may be utilised for increased efficiency in obtaining very low levels of manganese concentration in the purified effluent.

It will also be appreciated that operating parameters such as liquid flow rates will vary over a wide range having regard to a laboratory scale and also having regard to a commercial scale.

We also confirm that deposit of *Pedomicrobium manganicum* strain UQM 3067 was deposited at the Australian Government Analytical Laboratories, Suakin Street, Pymble, New South Wales, Australia on 26 Oct., 1992 and has been allocated Accession No. 92/51402.

PUBLICATIONS

Three publications have been prepared from the results of research undertaken in this project:

Sly, L. I., Arunpairojana, V. and Dixon, D. R. (1990) the binding of colloidal MnO$_2$ by extracellular polysaccharides of *Pedomicrobium manganicum* Appl. Env. Microbiol. 56: 2791-2794.

Sly, L. I., Arunpairojana, V. and Dixon, D. R. The adsorption and desorption of Mn$^{2+}$ by surface components of Pedomicrobium manganicum (submitted).

Sly, L. I., Arunpairojana, V. and Dixon, D. R. The adsorption and oxidation of manganese by immobilized cells of *Pedomicrobium manganicum* (In preparation).

RELATED PUBLICATIONS

During the course of this project a number of papers related to the topic were published; reports prepared, and papers delivered at conferences. These are listed for information:

Sly, L. I. (1986). Investigation into biological manganese oxidation and depostion in the Gold Coast water distribution system. UNIQUEST Report, University of Queensland. 91 pp.

Sly, L. I. (1987). Investigation into biological manganese oxidation and deposition in the Gold Coast water distribution system. UNIQUEST Report, University of Queensland. 57 pp.

Sly, L. I. and Arunpairojana, V. (1987). Isolation of manganese-oxidizing Pedomicrobium cultures from water by micromanipulation. J. Microbiological Methods 6, 177-182.

Sly, L. I., Arunpairojana, V. and Hodgkinson, M. C. (1988). *Pedomicrobium manganicum* from drinking-water distribution systems with manganese-related "dirty water" problems. Systematic and Applied Microbiology 11, 75-84.

Sly, L. I., Hodgkinson, M. C. and Arunpairojana, V. (1988). Effect of water velocity on the early development of manganese depositing biofilm in a drinking-water distribution systems. FEMS Microbiology Ecology 53, 175-186.

Sly, L. I., Hodgkinson, M. C. and Arunpairojana, V. (1988). The importance of high aesthetic quality potable water in tourist and recreational area. Conference on water quality and management for recreation and tourism, Brisbane, July 1988, pp. 157-161. Australian Water and Wastewater Association/International Association on Water Pollution Research and Control.

Sly, L. I. (1988). Abstract. Microbiological aspects of reticulated water. Annual Scientific Meeting. Australian Society for Microbiology, Canberra, May 1988. Australian Microbiologist 9 (2), Melbourne, Vic. p. 170.

Sly, L. I., Hodgkinson, M. C. and Arunpairojana, V. (1988) Abstract. Manganese-oxidizing pedomicrobia from drinking-water distribution systems with manganese-related "dirty-water" problems. Annual Scientific Meeting, Australian Society for Microbiology, Canberra, May 1988. Australian Microbiologist 9 (2), Melbourne, Vic. p. 245.

Sly, L. I., Hodgkinson, M. C. and Arunpairojana, V. (1989), The importance of high aesthetic quality potable water in tourist and recreational areas. Water Sci. Tech. 21: 183-187.

Waite, T. D., Sly, L. I., Khoe, G. Dixon, D. R., Chiswell, B. and Barley, G. E. (1989) Manganese and iron related problems in water supplies—observations and research needs. Proceedings Australian Water and Wastewater Association 13th Federal Convention, Canberra, pp. 437-440. The Institution of Engineers, Australia.

Sly, L. I., Hodgkinson, M. C. and Arunpairojana, V. (1989). The control of manganese deposition and "dirty water" on the Gold Coast water distribution system. Proceedings Australian Water and Wastewater Association 13th Federal Convention, Canberra, pp. 148–151. The Institute of Engineers, Australia.

Dixon, D. R., Sly, L. I., Waite, T. D., Chiswell, B. and Barley, G. E. (1989). Manganese removal: A model of cooperative research. Water 15, 32–34.

Sly, L. I. (1989). Deposition of manganese in the Wyong Shire water distribution system. UNIQUEST Report, University of Queensland. 37 p.

Sly, L. I., Chiswell, B., Hamilton, G. R., Dixon, D. R., Waite, T. D., and Willoughby, G. A. (1989). Investigation into manganese related and other water quality problems in the Pine Rivers Shire Council water supply. UNIQUEST Report, University of Queensland, 188 pp.

Sly, L. I., Hodgkinson, M. C. and Arunpairojana, V. (1990). The deposition of manganese in a drinking-water system. Appl. Env. Microbiol. 56: 628–639.

Sly, L. I., Hodgkinson, M. C. and Arunpairojana, V. The cause and control of manganese-related "dirty water" in a drinking-water distribution system. (In preparation).

REFERENCES

1. Adams, L. F. and Ghiorse, W. C. (1985). Influence of manganese on growth of a sheathless strain of *Leprothrix discophora*. Appl. Environ. Microbiolo 49: 556–562.
2. Andrews, G. F. and Przezdziecki, J. (1986). Design of fluidized-bed fermenters. Biotech. Bioeng. 28: 802–810.
3. Australian patent 534 238 (1979). Microbiological processes, D. E. Weiss, C.S.I.R.O.
4. Bean, E. L. (1974). Potable Water-Quality Goals. Journal American Water Works Association 66: 221–230.
5. Boogerd, F. C. and J. P. M. de Vrind. 1987. Manganese oxidation by *Leprothrix discophora*. J. Bacteriol. 169: 489–494.
6. Booudou, J. P., Kaiser, P. and Philipot, J. M. (1985). Elimination du fer et du manganese: interet des procedes biologiques. Water Supply 3: 151–155.
7. Bromfield, S. M. and David, D. J. (1976). Sorption and oxidation of manganous ions and reduction of manganese oxide by cell suspension of a manganese oxidizing bacterium. Soil Biol. Blochem. 8: 37–43.
8. Bromfield, S. M. and David, D. J. (1978). Properties of biologically formed manganese oxide in relation to soil manganese. AUst. J. Soil. Res. 16: 79–89.
9. Brown, M. J. and Lester, J. N. (1980). Comparision of bacterial extracellular polymer extraction methods. Appl. Environ. Microbiol. 40: 179–185.
10. Brunauer, S., Emmett, P. H. and Teller, E. J. (1938). Adsorption of gases in multimolecular layers. J. Amer. Chem. Soc. 60: 309–319.
11. Chapnick, S. D., Moore, W. S. and Nealson, K. H. (1982). Microbially mediated manganese oxidation in a freshwater lake. Limnol. Oceanogr. 27, 1004–1014.
12. Cohen-Bazire, G., Sistrom, W. R., and Stanier, R. Y. (1957). Kinetic studies of pigment synthesis by non-sulfur purple bacteria. J. Cell. Comp. Physiol. 49: 25–68.
13. Czekalla, C., Mervius, W. and Hanert, H. (1985). Quantitative removal of iron and manganese by microorganisms in rapid sand filters (in situ investigations). Water Supply 3: 111–123.
14. Domenico, P., Diedrich, D. L. and Cunha, BoA. (1989). Quantitive extraction and purification of exopolysaccharides from *Klebsiella pneumoniae*. Microbiol. Methods 9: 211–219.
15. Ehrlich, H. L. (1980). Different forms of microbiol manganese oxidation and reduction and their environmental significance in Trudinger, P. A., Walter, M. R., and Ralph, B. J. (eds) Biogeochemistry of Ancient and Modern Environments, p. 327–332. New York: Springer.
16. Emerson, S., Kalhorm, S., Jacobs, L., Tebo, B. M., Nealson, K. H., and Rosson, R. A. (1982). Environmental oxidation rate of manganese (II): bacterial catalysis. Geochim. Cosmochim. Acta 46: 1073–1079.
17. Famurewa, O., Sonntag, H. G. and Hirsch, P. (1983). Avirulence of 27 bacteria that are budding, prosthecate, or both. Int. J. syst. Bacteriol. 33: 565–572.
18. Frischherz, H., Zibuschka, F., Jung, H. and Zerobin, W. (1985) Water Supply 3: 125–136.
19. Garman, D. E. J. (1983). Water 2000, Vol.7, Water Quality Issues.
20. Gebers, R. (1981). Enrichment, isolation and amended description of *Pedomicrobium ferrugineum*. Aristovskaya and *Pedomicrobium manganicum* Aritovskaya. Int. J. Syst. Bact. 31: 302–316.
21. Geesey, G. G., Jang, L., Jolley, J. G., Hankins, M. R., Iwaoka, T. and Griffiths, P. R. (1988). Binding of metal ions by extracellular polymers of biofilm bacteria. War. Sci. Tech. 20: 161–165.
22. Ghiorse, W. C. (1984). Biology of iron- and manganese-depositing bacteria. Ann Rev. Microbiol. 38 515–550.
23. Ghiorse, W. C., and Hirsch, P. (1979). An ultrastructural study of iron and manganese deposition associated with extracellular polymers of Pedomicrobium-like budding bacteria. Arch. Microbiol. 123: 213–226.
24. Green, L. A. (1970). The problems of iron and manganese in water supply, p. 3. British Waterworks Association, London.
25. Gregory, E. and Staley, J. T. (1982). Widespread distribution of ability to oxidize manganese among freshwater bacteria. Appl. Environ. Microbiol. 44: 509–511.
26. Hart, B. T. (1974). A compilation of Australian Water Quality Criteria. Australian Water Resources Council Technical Paper No. 7.
27. Hayat, M. A. (1975) Positive straining for electron microscopy. Van Nostrand Reinhold Co., New York.
28. Healy, T. W., Herring, A. P. and Fuerstenau, D. W. (1966). The effect of crystal structure on the surface properties of a series of manganese dioxides. J. Coll. Interface Science 21: 435–444.
29. Ishii, H., Koh, H., and Satoh, K. (1982). Spectrophotometric determination of manganese utilizing metal ion substitution in the cadmium—$\alpha$, $\beta$, $\tau$, $\delta$—tetrakis (4-carboxyphenyl) porphine complex. Analytica Chemica Acta 136: 347–352.
30. Kepkay, P. E., Burdige, D. J. and Nealson, K. H. (1984). Kinetics and bacterial manganese binding and oxidation in the chemostat. Geomicrobiol. J. 3: 245–262.
31. Kolarik, L. O., Priestley, A. J. and Weiss, D. E. (1977) The sirofloc process for turbidity and colour removal. Proc. Seventh Conv. AWWA, Canberra, pp. 143–161.
32. Lloyd, A., Grzeskowiak, R. and Mendham, J. (1983). The removal of manganese in water treatment clarification processes. Water Research 17: 1517–1523.

33. Mac Rae, I. C. and Evan, S. K. (1983). Factors influencing the adsorption of bacteria to magnetite in water and wastewater. Water Res. 17: 271–277.
34. Mac Rae, I. C. and Evans, S. K. (1984). Removal of bacteria from water by adsorption to magnetite. Water Res. 18: 1377–1380.
35. Moore, R. L. and Marshall, K. C. (1981). Attachment and rosette formation by Hyphomicrobia. Appl. Env. Microbiol. 42: 751–757.
36. Morgan, J. J. and Stump, W. (1964). Colloid-chemical properties of manganese dioxide. J. Coll. Science 19: 347–359.
37. Morgan, J. J. and Stumm, W. (1964). The role of multivalent metal oxides in limnological transformations, as exemplified by iron and manganese. Advances in Water Pollution Research: Proceedings of the Second International Conference, Vol. 1 (Jaag, O. Ed.) pp. 103–131. Pergamon Press, Oxford.
38. Mouchet, P., Magnin, J., Mazounie, P., Puill, A. and Fressonnet, B. (1985). Elimination du fer et du manganese contenus dans les eaux souterraines: problems classiques, progress recents. Water Supply 3: 137–149.
39. Murray, J. W. (1974). The surface chemistry of hydrous manganese dioxide. J. Coll. Interface Science. 46: 357–371.
40. Murray, J. W., L. S. Balistrieri, and B. Paul. (1984). The oxidation state of manganese in marine sediments and ferromanganese nodules. Geochim. Cosmochim, Acta. 48: 1237–1247.
41. National Health and Medical Research Council and the Australian Water Resources Council (1980). Desirable Quality for Drinking Water in Australia. Australian Government Printing Service, Canberra.
42. Nealson, K. H. (1983). The microbial manganese cycle. In: Microbial Geochemistry (Krumbein, W. E. Ed.) pp. 191–221. Blackwell Scientific Publications, Oxford.
43. Nealson, K. H., B. M. Tebo, and R. A. Rosson. (1988) Occurrence and mechanisms of microbial oxidation of manganese. Adv. Appl. Microbiol. 33: 279–318.
44. Newman, G. R., B. Jasani, and E. D. Williams. (1983). A simple post-embedding system for the rapid demonstration of tissue antigens under the electron microscope. Histochemical Journal 15: 543–555.
45. Nieduszynski, I. A. (1985). Connective tissue polysaccharides, In: Polysaccharides, Topics in Structure and morphology (Arkins, E. D. T. Ed.) Ch. 4, p. 107–139. Macmillan Press, Basingstoke.
46. Report (186). Review of aeration/destratification techniques in Australian surface water storages. Queensland Department of Local Government.
47. Rosson, R. A., Teb, B. M. and Nealson, K. H. (1984). Use of poisons in determination of microbial manganese binding rates in seawater. Appl. Env. Microbiol. 47: 740–745.
48. Sly, L. I. (1986). Investigation into biological manganese oxidation and deposition in the Gold Coast water distribution system. UniQuest Report, University of Queensland.
49. Sly, L. I. and Arunpairojana, V. (1987). Isolation of manganese oxidizing Pedomicrobium cultures from water by micromanipulation. J. Microbiol. Methods 6: 177–182.
50. Sly, L. I., Arunpairojana, V. and Dixon, D. R. (1990). The binding of colloidal $MnO_2$ by extracellular polysaecharides of Pedomicrobium manganicum. Appl. Env. Microbiol. 56:, 2791–2794.
51. Sly, L. I., Arunpairojana, V. and Hodgkinson, M. C. (1988). Pedomicrobium manganicum from drinking-water distribution systems with manganese-related "dirty water" problems. Syst. Appl. Microbiol. 11: 75–84.
52. Sly, L. I., M. C. Hodgkinson, and V. Arunpairojana. (1988). Effect of water velocity on the early development of manganese depositing biofilm in a drinking-water distribution system. FEMS Microbiology Ecology 53: 175–186.
53. Sly, L. I., M. C. hodgkinson, and V. Arunpairojana. (1989). The control of manganese deposition and "dirty water" in the Gold Coast water distribution system. Proceedings Australian Water and Wastewater Association 13th Federal Convention, Canberra, pp 148–151. The Institution of Engineers, Canberra, Australia.
54. Tebo, B. M. and Emerson, S. (1986). Microbial manganese (II) oxidation in the marine environment: a quantitative study. Biogeochem. 2, 149–161.
55. Temperature dependence of Mn (ii) oxidation in lakewaters: a test of biological involvement. Geochimica et Cosmochimica Acta 48: 1353–1356.
56. Tessier, A., Campbell, P. G. C. and Bisson, M. (1979). Sequential extraction procedure for the speciation of particulate trace metals. Anal. Chem. 51, 844–851.
57. Tipping, E., D. W. Thompson, and W. Davison, 1984. Oxidation products of Mn(II) in lake waters. Chem. Geol. 44: 359–383.
58. Tyler, P. A. and Marshall, K. C. (1967). Microbial oxidation of manganese in hydro-electric pipelines. Antonie van Leeuwenhoek J. Microbiol. Serol. 33, 171–183.
59. Tyler, P. A; and Marshall, K. C. (1967).
60. Venable, J. H. and R. Coggeshall. 1965. A simplified lead citrate stain for use in electron microscopy. J. Cell Biol. 25: 407–408.
61. Wong, J. M. (1984). Chlorination-filtration for iron and manganese removal. Journal American Water Works Association 76: 76–79.
62. World Health Organisation (1984). Guidelines for Drinking-Water Quality. Volumes 1 and 2, Geneva.

TABLE 1

Preparations of magnetite used in the study

| Source* | Size (μm) | Isoelectric point | Surface area ($m^2/g$) |
|---|---|---|---|
| Savage River, Tasmania | 104–147 | 5.14 | 0.47 |
| " | 147–211 | 5.47 | 0.37 |
| " | 211–246 | 5.48 | 0.44 |
| Biggenden, Queensland (Sample 1) | 212–300 | 5.63 | 0.75 |
| Biggenden, Queensland (Sample 2) | 212–300 | 5.82 | 0.73 |

*Magnetite preparations were pretreated through 8 alternating magnetic field (8 AMF) cycles according to the method of Mac Rae and Evans (1983).

TABLE 2

Effect of suspending solution on the desorption of P. manganicum UQM3067 adsorbed onto 1% magnetite (211–246 μm) after 30 seconds mixing

| No. cells remaining absorbed* ($\times 10^6$) | |
|---|---|
| Suspending solution (Mac Rae & Evans, 1983, 1984) | PC growth medium |
| 8.95 | 9.40 |

TABLE 2-continued

Effect of suspending solution on the desorption of *P. manganicum* UQM3067 adsorbed onto 1% magnetite (211-246 μm) after 30 seconds mixing
No. cells remaining absorbed* ($\times 10^6$)

| Suspending solution (Mac Rae & Evans, 1983, 1984) | PC growth medium |
|---|---|
| 9.95 | 10.60 |
| 9.75 | 10.35 |
| 8.50 | 10.65 |
| 10.04 | 7.60 |
| 9.15 | 9.20 |
|  | 9.80 |
| Mean 9.45 | Mean 9.66 |
| SD ± 0.70 | SD ± 1.07 |

*The number of cells originally adsorbed was 11.4 × $10^6$
SD, Standard deviation
Mean values not significantly different at P < 0.05

TABLE 3

Effect of suspending solution on the desorption of *P. manganicum* UQM3067 adsorbed onto 1% magnetite (211-246 μm) after 10 minutes
No. cells remaining adsorbed* ($\times 10^6$)

| Suspending solution (Mac Rae & Evans, 1983, 1984) | PC growth medium |
|---|---|
| 8.4 | 9.6 |
| 9.9 | 9.7 |
| 7.2 | 8.4 |
| 8.1 | 9.9 |
| 9.3 | 9.95 |
| 8.2 | 7.0 |
|  | 5.7 |
| Mean 8.52 | Mean 8.61 |
| SD ± 0.95 | SD ± 1.67 |

*The number of cells originally adsorbed was 11.4 × $10^6$
SD, Standard deviation
Mean values not significantly different at P < 0.05

TABLE 4

Effect of time on the desorption of *P. manganicum* UQM3067 adsorbed onto 1% magnetite (211-246 μm) in suspending fluid
No. cells remaining adsorbed* ($\times 10^6$)

| After 30 seconds | After 10 minutes |
|---|---|
| 8.95 | 8.4 |
| 9.95 | 9.9 |
| 9.75 | 7.2 |
| 8.50 | 8.1 |
| 10.40 | 9.3 |
| 9.15 | 8.2 |
| Mean 9.45 | Mean 8.52 |
| SD ± 0.70 | SD ± 0.95 |

*The number of cells originally adsorbed was 11.4 × $10^6$
SD, Standard deviation
Mean values not significantly different at P < 0.05

TABLE 5

Effect of time on the desorption of *P. manganicum* UQM3067 adsorbed onto 1% magnetite (211-246 μm) in PC growth medium
No. cells remaining adsorbed* ($\times 10^6$)

| After 30 seconds | After 10 minutes |
|---|---|
| 9.4 | 9.6 |
| 10.6 | 9.7 |
| 10.35 | 8.4 |
| 10.65 | 9.9 |
| 7.6 | 9.95 |
| 9.2 | 7.0 |
| 9.8 | 5.7 |
| Mean 9.66 | Mean 8.61 |
| SD ± 1.07 | SD ± 1.67 |

*The number of cells originally adsorbed was 11.4 × $10^6$
SD, Standard deviation
Mean values not significantly different at P < 0.05

TABLE 6

Adsorption of *P. manganicum* UQM3067 by repetitive treatments with fresh 1% magnetite (211-246 μm)

| Treatment | No. cells unadsorbed | No. cells adsorbed | % adsorbed | % of original adsorbed |
|---|---|---|---|---|
| 1 | 1.77 × $10^8$ | 2.96 × $10^8$ | 62.6 | 62.6 |
| 2 | 7.4 × $10^7$ | 1.03 × $10^8$ | 58.2 | 84.4 |
| 3 | 4.5 × $10^7$ | 2.9 × $10^7$ | 39.2 | 90.5 |
| 4 | 3.0 × $10^7$ | 1.5 × $10^7$ | 33.3 | 93.7 |

TABLE 7

Adsorption of $Mn^{2+}$ to treated surface components of *P. manganicum* and abiological $MnO_2$.

| Surface | Treatment | $Mn^{2+}$ adsorbed μg |
|---|---|---|
| *Pedomicrobium manganicum* | Viable (aerobic) | 76.3 |
| " | Viable ($N_2$ atmosphere) | 78.7 |
| " | 1 mM $HgCl_2$ | 76.8 |
| " | 10 mM $NaN_3$ | 76.8 |
| " | Protease (0.3 units/ml) | 72.3 |
| " | 0.05% glutaraldehyde | 72.4 |
| " | 2M NaOH | 68.9 |
| " | Autoclaved (121° C./15 min) | 32.7 |
| " | Steamed (100° C./10 min) | 29.0 |
| Abiological $MnO_2$ |  | 30.9 |

TABLE 8

Effect of pH on $Mn^{2+}$ binding capacity of particulate $MnO_2$.

| Particulate $MnO_2$ | ng $Mn^{2+}$ bound per μg $MnO_2$ | | | | | |
|---|---|---|---|---|---|---|
|  | pH8 | pH7 | pH6 | pH5 | pH4 | pH3 |
| *P. manganicum* (viable) | 154.4 | 158.6 | 155.4 | 143.8 | 126.2 | 94.5 |
| *P. manganicum* (autoclaved) | 70.4 | 50.2 | 27.8 | 9.7 | 0 | 0 |
| Abiological $MnO_2$ | 66.4 | 66.4 | 60.8 | 19.0 | 0 | 0 |

TABLE 9

Determination of $Mn^{2+}$ adsorbed to *P. manganicum* by various desorption treatments.

| Desorption treatment | $Mn^{2+}$ desorbed (%)[1] Sample pH | | |
|---|---|---|---|
|  | 7 | 4 | 2 |
| pH only | 0 | 35.1 | 90.5 |
| 10 mM $MgSO_4$, pH7[2] | 0 | 2.2 | 83.0 |
| 20 mM $MgSO_4$, pH7[3] | 1.5 | 3.4 | 76.8 |
| 10 mM $CuSO_4$, pH4.2[4] | 77.2 | 95.7 | 72.6 |
| 10 mM $CuSO_4$ (in 1M ammonium acetate, pH7)[5] | 82.8 | 85.7 | 70.8 |

[1]Defined as the difference between $CuSO_4$— or $MgSO_4$— *treated cells and water-treated cells.*
[2,3,4]Treatments of Bromfield and David (7).
[5]Treatment of Bromfield and David (8).

TABLE 10

Effect of pH on the binding of colloidal $MnO_2$ by cells of *P. manganicum.*

Colloidal $MnO_2$ removed*

| | After 2 min. | | | After *150 min. | | | After 24 h. | | |
|---|---|---|---|---|---|---|---|---|---|
| pH | Control+ (μg) | With cells (μg) | % bound | Control+ (μg) | With cells (μg) | % bound | Control+ (μg) | With cells (μg) | % bound |
| 4 | 0 | 204.8 | 54.0 | 10.0 | 342.2 | 88.0 | 36.4 | 243.1 | 54.8 |
| 5 | 0 | 96.6 | 25.6 | 12.2 | 125.7 | 30.1 | 48.5 | 182.3 | 35.4 |
| 6 | 0 | 33.9 | 9.0 | 16.7 | 63.3 | 12.3 | 42.8 | 80.6 | 10.0 |
| 7 | 0 | 41.0 | 10.9 | 6.0 | 64.7 | 15.5 | 53.8 | 88.5 | 9.2 |

*Defined as $MnO_2$ retained by filtration through a 0.45 μm membrane filter
+Colloidal $MnO_2$ solution without cells added
After correction for control values

TABLE 11

Effect to magnetite concentration on adsorption of *P. maganicum* cells

| | Magnetite concentration (%) | | | |
|---|---|---|---|---|
| | 1 | 15 | 30 | 45 |
| Inoculum (No. of cells) | $1.25 \times 10^{10}$ | $1.25 \times 10^{10}$ | $1.25 \times 10^{10}$ | $1.25 \times 10^{10}$ |
| No. cells adsorbed | $4.55 \times 10^9$ | $6.04 \times 10^9$ | $7.07 \times 10^9$ | $8.86 \times 10^9$ |
| % cells adsorbed | 36.4 | 48.3 | 56.6 | 70.9 |
| cells adsorbed/ml magnetite | $4.55 \times 10^9$ | $4.02 \times 10^8$ | $2.36 \times 10^8$ | $1.97 \times 10^8$ |
| cells/g magnetite$^a$ | $2.06 \times 10^9$ | $1.82 \times 10^8$ | $1.06 \times 10^8$ | $0.89 \times 10^8$ |
| cells/$10^4$ μm$^{2b}$ | 27.5 | 2.43 | 1.41 | 1.19 |

$^a$1 ml magnetite = 2.215 g dry weight
$^b$1 g magnetite has a surface area of 0.75 m$^2$

TABLE 12

Immobilization of *P. manganicum* cells on magnetite in a jar test model compared with the CRFB

| | Jar test model | CFRB |
|---|---|---|
| Magnetite concentration (%) | 36 | 36 |
| Inoculum (No. cells) | $4.44 \times 10^{10}$ | $2.17 \times 10^{11}$ |
| No. cells adsorbed | $2.85 \times 10^{10}$ | $1.58 \times 10^{11}$ |
| % cells adsorbed | 64.2 | 73.0 |
| Cells adsorbed/ml magnetite | $5.7 \times 10^8$ | $1.32 \times 10^8$ |
| Cells/g magnetite$^a$ | $2.57 \times 10^8$ | $0.60 \times 10^8$ |
| Cells/$10^4$ μm$^{2b}$ | 3.43 | 0.8 |

$^a$1 ml magnetite = 2.215 g dry weight
$^b$1 g magnetite has a surface area of 0.75 m$^2$

TABLE 13

Removal of $Mn^{2+}$ by the CRFB operated with a residence time of 21 h

| Age (months) | Input $MN^{2+}$ (mg/l) | Residual $Mn^{2+}$ (μg/l) | % Removal | Removal rate (μg/h) |
|---|---|---|---|---|
| <1 | 0.2553 | 0 | 100 | 39.8 |
| <1 | 0.4820 | 0 | 100 | 76.6 |
| <1 | 0.5142 | 0 | 100 | 80.2 |
| <1 | 0.9590 | 0 | 100 | 153.4 |
| <1 | 1.9070 | 0 | 100 | 305.1 |
| 3 | 0.2545 | 65.4 | 74.3 | 28.6 |
| 3 | 0.5398 | 69.0 | 87.2 | 71.6 |
| 3 | 1.0561 | 101.9 | 90.4 | 144.1 |
| 3 | 1.9620 | 137.8 | 93.0 | 280.9 |
| 3 | 4.7510 | 408.8 | 91.4 | 686.1 |
| 3 | 8.4760 | 581.0 | 93.1 | 1247.4 |
| 4 | 2.0250 | 181.0 | 91.1 | 293.2 |
| 5 | 1.9730 | 182.0 | 90.8 | 283.0 |

TABLE 14

Conversion of $Mn^{2+}$ by the CRFB operated with a residence time of 21 h after 3 months

| Input $Mn^{2+}$ (mg/l) | Effluent Mn (μg/l) | | | |
|---|---|---|---|---|
| | Total | Soluble | Adsorbed | MnOx |
| 0.2545 | 94.6 | 59.1 | 5 | 31 |
| 0.5398 | 116.3 | 64.5 | 7 | 41 |
| 1.0561 | 148.2 | 86.7 | 9 | 53 |
| 1.9620 | 195.3 | 135.3 | 8 | 52 |
| 4.7510 | 403.1 | 335.3 | 10 | 57 |
| 8.4760 | 534.6 | 471.0 | 11 | 52 |

TABLE 15

Effect of pH control on $Mn^{2+}$ oxidation and removal

| Controlled pH | Input $Mn^{2+}$ (μg/l) | Residual $Mn^{2+}$ (μg/l) | % Removal | Removal Rate (μg/h) |
|---|---|---|---|---|
| 7.0 | 1986 | 1937 | 2.5 | 7.8 |
| 7.5 | 2001 | 372 | 81.4 | 255.7 |
| 7.8 | 2015 | 205 | 90.0 | 284.2 |
| 8.0 | 2013 | 48 | 97.6 | 306.5 |

TABLE 16

Effect of pH control on $Mn^{2+}$ conversion

| Controlled pH | Input $Mn^{2+}$ (μg/l) | Effluent Mn (μg/l) | | | |
|---|---|---|---|---|---|
| | | Total | Soluble | Adsorbed | MnOx |
| 7.0 | 1986 | 2010 | 1906 | 27 | 55 |
| 7.5 | 2001 | 408 | 360 | 10 | 41 |
| 7.8 | 2015 | 291 | 203 | 17 | 71 |
| 8.0 | 2013 | 202 | 56 | 12 | 136 |

TABLE 17

Effect of age on the removal of 2 mg/l $Mn^{2+}$ by the CRFB operated at an influent of pH 7 and a residence time of 21 h

| Age (months) | Input $Mn^{2+}$ (mg/l) | Residual $Mn^{2+}$ (μg/l) | % Removal | Removal Rate (μg/h) |
|---|---|---|---|---|
| 1 | 1.907 | 0 | 100 | 305.1 |
| 3 | 1.962 | 137.8 | 93 | 280.9 |
| 4 | 2.025 | 181.0 | 91.1 | 293.2 |
| 5 | 1.973 | 182.0 | 90.8 | 283.0 |

We claim:

1. A process for removal of manganese from water which includes the steps of:
   (i) preparing a fluidised bed of particles in a bioreactor capable of adsorbing a strongly adherent biofilm of microorganisms capable of metabolising manganese to provide an actively propagated biomess; and
   (ii) passing a stream of water through the fluidised bed where manganese is adsorbed by said biomass and is thus removed from the stream of water to provide a purified effluent of water exiting from the bioreactor.

2. A process as claimed in claim 1, wherein the particle size of the particles in the fluidised bed is of the range 50 μm to 1000 μm.

3. A process as claimed in claim 1, wherein the microorganisms are strains of *Pedomicrobium manganicum*.

4. A process as claimed in claim 1, wherein the microorganisms are supported on magnetite particles.

5. A process as claimed in claim 1, wherein the biomass is maintained at a pH of 7.8 in step (ii).

6. A process as claimed in claim 4, wherein the magnetite particles have a particle size of approximately 200–300 μm diameter.

7. A process as claimed in claim 1, wherein the water is passed through the bioreactor continuously and also through a mixing vessel whereby fresh influent is passed into said mixing vessel at approximately the same rate as effluent or treated water is passed out of the mixing vessel to a receptacle for treated water.

8. A process as claimed in claim 7, wherein the mixing vessel is subject to aeration.

9. A process as claimed in claim 7, wherein a first recirculation pump is used to pump water from the bioreactor to the mixing vessel.

10. A process as claimed in claim 7, wherein a second recirculation pump is also used to pump water from the mixing vessel to the bioreactor.

11. A process as claimed in claim 1, wherein a multiplicity of bioreactors in series are utilized in step (i) wherein water is passed from one bioreactor to provide an effluent low in manganese concentration.

12. A process as claimed in claim 11, wherein a mixing vessel is used which is in liquid communication with each bioreactor in the series.

13. A process as claimed in claim 1, wherein purified effluent is passed out of the top of the bioreactor.

* * * * *